United States Patent
Gentry et al.

(10) Patent No.: US 7,664,957 B2
(45) Date of Patent: Feb. 16, 2010

(54) DIGITAL SIGNATURES INCLUDING IDENTITY-BASED AGGREGATE SIGNATURES

(75) Inventors: Craig B. Gentry, Mountain View, CA (US); Zulfikar Amin Ramzan, San Mateo, CA (US)

(73) Assignee: NTT DOCOMO, Inc., Tokyo (JP)

( * ) Notice: Subject to any disclaimer, the term of this patent is extended or adjusted under 35 U.S.C. 154(b) by 986 days.

(21) Appl. No.: 11/134,723

(22) Filed: May 19, 2005

(65) Prior Publication Data

US 2005/0262353 A1 Nov. 24, 2005

Related U.S. Application Data

(60) Provisional application No. 60/573,651, filed on May 20, 2004.

(51) Int. Cl.
*H04L 9/32* (2006.01)
*H04L 9/00* (2006.01)
*H04L 9/28* (2006.01)
*H04K 1/00* (2006.01)
*B41K 3/38* (2006.01)

(52) U.S. Cl. .......................... 713/176; 380/28; 380/59; 380/277

(58) Field of Classification Search ........................ None
See application file for complete search history.

(56) References Cited

U.S. PATENT DOCUMENTS

| | | | |
|---|---|---|---|
| 5,966,445 | A | 10/1999 | Park et al. |
| 6,212,637 | B1 | 4/2001 | Ohta et al. |
| 6,778,666 | B1 | 8/2004 | Kuzmich et al. |

2005/0022102 A1 1/2005 Gentry

FOREIGN PATENT DOCUMENTS

EP 1 478 121 A2 11/2004

(Continued)

OTHER PUBLICATIONS

A. Shamir, Identity-Based Cryptosystems and Signature Schemes. In Proc. of Cypto 1984, LNCS 196, pp. 47-53. Springer-Verlag, 1985.*

(Continued)

*Primary Examiner*—Nasser G Moazzami
*Assistant Examiner*—Oscar A Louie
(74) *Attorney, Agent, or Firm*—Haynes and Boone, LLP

(57) ABSTRACT

Methods and systems are provided that allow multiple identity-based digital signatures to be merged into a single identity-based "aggregate" digital signature. This identity-based aggregate signature has a shorter bit-length than the concatenation of the original unaggregated identity-based signatures. The identity-based aggregate signature can be verified by anyone who obtains the public keys of one or more Private Key Generators (PKGs), along with a description of which signer signed which message. The verifier does not need to obtain a different public key for each signer, since the signature scheme is "identity-based"; the number of PKGs may be fewer than the number of signers. Consequently, the total information needed to verify the identity-based aggregate signature—namely, a description of who signed what, the PKGs' public keys, and the identity-based aggregate signature itself—may be less than the information needed to verify separate digital signatures—namely, a description of who signed what, the public verification keys for all of the signers, and the concatenation of the signers' signatures. In some embodiments, the identity-based aggregate signature scheme has essentially the minimum-possible Kolmogorov complexity.

91 Claims, 1 Drawing Sheet

FOREIGN PATENT DOCUMENTS

| WO | WO 99/30458 | 6/1999 |
|---|---|---|
| WO | WO 2004/021638 | 3/2004 |
| WO | WO 2004/028075 | 4/2004 |

OTHER PUBLICATIONS

Dan Boneh and Matthew Franklin, Identity-Based Enciyption from the Weil Pairing, SIAM J. of Computing, vol. 32, No. 3, pp. 586-615, 2003.*

A. Lysyanskaya, S. Micali, L. Reyzin, and H. Shacham, "Sequential Aggregate Signatures from Trapdoor Permutations," in Proc. of Eurocrypt 2004, LNCS 3027, p. 3027, pp. 74-90, Springer-Verlag, 2004.*

A. Shamir, Identity-Based Cryptosystems and Signature Schemes. In *Proc. of Crypto 1984*, LNCS 196, pp. 47-53. Springer-Verlag, 1985.

Dan Boneh and Matthew Franklin, *Identity-Based Encryption from the Weil Pairing*, SIAM J. of Computing, vol. 32, No. 3, pp. 586-615, 2003.

A. Lysyanskaya, S. Micali, L. Reyzin, and H. Shacham, "Sequential Aggregate Signatures from Trapdoor Permutations," in Proc. of Eurocrypt 2004, LNCS 3027, pp. 74-90, Springer-Verlag, 2004.

S. Micali, K. Ohta, and L. Reyzin. Accountable Subgroup Multisignatures (extended abstract). In Proc of CCS 2001, pp. 245-254. ACM Press, 2001.

D. Boneh, B. Lynn, H. Shacham "Short Signatures from the Weil Pairing" in Proc. of Asiacrypt 2001, LNCS 2248, pp. 514-532, Springer-Verlag, 2001.

P.S.L.M. Barreto, H.Y. Kim, B. Lynn, and M. Scott. Efficient Algorithms for Pairing-Based Cryptosystems. In Proc. Of Crypto 2002, LNCS 2442, pp. 354-368. Springer-Verlag, 2002.

D. Boneh, C. Gentry, B. Lynn, and H. Shacham. Aggregate and Verifiably Encrypted Signatures from Bilinear Maps. In Proc. of Eurocrypt 2003, LNCS 2656, pp. 416-432. Springer-Verlag, 2003.

Secure Hash Signature Standard, Federal Information Processing Standard Publication 180-2 (FIPS PUB 180-2) Aug. 1, 2002, National Institute of Standards and Technology (NIST), United States of America.

D. Boneh, B. Lynn, C. Gentry, H. Shacham "A Survey of Two Signature Aggregation Techniques," RSA Laboratories Cryptobytes, vol. 6, No. 2, Summer 2003 pp. 1-10.

S. Knoop, "Project: Supersingular Curves and the Weil Pairing in Elliptic Curve Cryptography" Math 842: Final Project, Dec. 15, 2004, pp. 1-15.

C. Zhijie, S. Jianyi, W. Zhenhua, Y. Jiachen "A Realized Mathematical Scheme On The Digital Signature of Events" Institute of Network Information Security, East China Normal University, Shanghai 200062, P.R. China pp. 1-9.

E. York "Elliptic Curves Over Finite Fields" George Mason University, May 7, 1992, pp. 1-24.

ECC Cryptography Tutorial—2.0 Elliptic Curve Groups over Real Numbers, http://certicom.com/index.php?action=edd tutorial,ecc_tut_2_0, Certicom, p. 1 of 1.

ECC Cryptography Tutorial—2.1 Elliptic Curve Addition: A Geometric Approach, http://certicom.com/index.php?action=edd_tutorial,ecc_tut_2_1, Certicom, p. 1 of 1.

ECC Cryptography Tutorial—2.2 Elliptic Curve Addition: An Algebraic Approach, http://certicom.com/index.php?action=edd_tutorial,ecc_tut_2_2, Certicom, p. 1 of 1.

* cited by examiner

DIGITAL SIGNATURES INCLUDING IDENTITY-BASED AGGREGATE SIGNATURES

CROSS REFERENCE TO RELATED APPLICATIONS

The present application claims priority of U.S. provisional patent application No. 60/573,651 filed May 20, 2004, incorporated herein by reference.

BACKGROUND OF THE INVENTION

The present invention relates to digital signatures, and in particular, among other things, to identity-based digital signatures and other individual and aggregate signatures.

A digital signature is a string of characters (e.g., bits) that allows a hypothesis to be verified cryptographically. For example, for the hypothesis that that Bob approved the contents of document D, Bob can generate a digital signature S on the document D using his secret signing key SK which corresponds to his public signature verification key VK. Anyone who knows S, D and VK (and who has confirmed that VK is Bob's public key, rather than an impostor's) can verify cryptographically that Bob has indeed approved the document D. S, together with the additional required verification information (D,VK), is Bob's digital signature. If the digital signature scheme is secure, it must be hard for people other than Bob to forge his digital signature, since they do not know Bob's secret SK.

The notion of digital signatures was proposed in 1976 by Diffie and Hellman in their paper "New Directions in Cryptography." Since then, much work has been done to make digital signatures efficient. For example, one line of research is to find signature schemes that are computationally efficient, in the sense that signature generation or signature verification (or both) can be completed verify quickly, even on devices that have slow processors. Another line of research is to find signature schemes that are bandwidth efficient, in the sense that the digital signature scheme adds minimal bandwidth overhead. The invention described in the present patent application belongs primarily to the second line of research.

1. Previous Solutions

In the prior art, several approaches have been taken to make signature schemes more bandwidth-efficient. One approach is to make the size of S as small as possible (in terms of the number of bits needed to convey the value of S). For example, in their paper "Short Signatures from the Weil Pairing" (in Proc. of Asiacrypt 2001, LNCS 2248, pages 514-532, Springer-Verlag, 2001), incorporated herein by reference, Boneh, Lynn and Shacham described a signature scheme that achieves sufficient security (under assumption called the "computational Diffie-Heilman" assumption) even if the signatures are only about 160 bits. However, although S is only 160 bits, other information is also needed to verify the signature—namely, the signer's public signature verification key VK and a description D of the document that the signer signed. So, the signature scheme's overall bandwidth is not really 160 bits; it is 160+|VK|+|D|, where |D| denotes the number of bits needed to describe the document that was signed, and |VK| denotes the length of the signer's verification key.

Another approach for achieving bandwidth-efficient signatures is signatures that allow message recovery. In these schemes, a verifier can recover some number (say, k) bits of D from the signature S. Thus, the total number of bits needed to verify the signature is |S|+|VK|+(|D|−k). In all of the currently known signature schemes that allow message recovery, k is at most |S|−160; so, the total information needed to verify is still at least 160+|VK|+|D|, just as in the Boneh-Lynn-Shacham scheme.

Yet another approach that is sometimes described as enabling a bandwidth improvement is identity-based signatures. (See A. Shamir, "Identity-Based Cryptosystems and Signature Schemes," in Proc. of Crypto 1984, LNCS 196, pages 47-53, Springer-Verlag, 1985, incorporated herein by reference.) In an identity-based signature scheme, the signer (call him "Bob") does not generate his own key pair (SK, VK), as he does in an ordinary digital signature scheme. Instead, a trusted authority called a "Private Key Generator" (PKG) generates Bob's secret key $SK_{Bob}$ for him as a function of Bob's "identity" $ID_{Bob}$ (e.g., his name or email address) and the PKG's own secret key $SK_{PKG}$. To verify Bob's signature S on document D, the verifier also needs Bob's identity $ID_{Bob}$ and his PKG's public key $PK_{PKG}$. Bob's identity can be arbitrarily short—e.g., much less than 160 bits—but the PKG's public key is typically fairly long (e.g., 160 bits or more); thus, there is not really a significant bandwidth advantage over the bandwidth-efficient approaches described above. However, notice an interesting aspect of identity-based signature schemes (that will later be useful for identity-based aggregate signatures, as described in the present invention)—namely, that the verifier does not need an individualized public verification key VK specifically for Bob to verify Bob's signature; instead, the verifier only needs a public key for Bob's PKG (which may act as PKG for many other clients, as well).

Still another approach for achieving bandwidth-efficient signatures is aggregate signatures. An aggregate signature scheme allows signatures on different documents that are produced by different signers to be "aggregated" into a single short signature. More specifically, suppose that there are n signers with public signature verification keys ($VK_1, \ldots, VK_n$) and that these n signers sign the respective documents ($D_1, \ldots, D_n$), thereby producing n signatures ($S_1, \ldots, S_n$). In an aggregate signature scheme, the values ($S_1, \ldots, S_n$) can be aggregated into a single "short" value S. It should be the case that |S| is much less that $|S_1|+\ldots+|S_n|$; ideally, |S| should not even depend on n (the number of signatures that are aggregated). The total information needed to verify that, for all $I \in [1,n]$, the signer with verification key $VK_i$ signed document $D_i$ is $|VK_1|+\ldots+|VK_n|+|D|+|S|$, where D is a description of the signed documents ($D_1, \ldots, D_n$) that may be more compact than listing $D_1$ through $D_n$ separately. In prior art aggregate signature schemes, the description of the respective verification keys cannot be aggregated; thus, the total verification information grows linearly with n, even if the description of the signed documents D does not. Currently, there are two aggregate signature schemes.

One aggregate signature scheme, described in patent application Ser. No. 10/499,853 entitled "Signature Schemes Using Bilinear Mappings", filed Apr. 15, 2003 by Craig Gentry, incorporated herein by reference, uses bilinear "pairings" (e.g., as defined over elliptic curves or Abelian varieties), and it allows anyone to aggregate a collection of signatures in any order. Another scheme—described in A. Lysyanskaya, S. Micali, L. Reyzin, and H. Shacham, "Sequential Aggregate Signatures from Trapdoor Permutations," in Proc. of Eurocrypt 2004, LNCS 3027, pages 74-90, Springer-Verlag, 2004, incorporated herein by reference) allows only sequential aggregation (which is less flexible), but it uses the more widely-accepted notion of a trapdoor permutation (as opposed to the notion of pairings, which have been used to construct cryptosystems only in recent years). The second scheme does not achieve the "ideal" objective of aggregate signature schemes—namely, to make S independent of n. Rather, in their scheme, the size of S increases by a bit or two for each additional signer. Since |S| grows quite slowly as n increases, their scheme is considered to be an aggregate signature scheme even though it does not achieve the ideal objective.

2. Drawbacks of Previous Solutions

The ultimate objective of the line of research focusing on bandwidth efficiency is to find a signature scheme in which the total information needed to verify is minimized. For any signature scheme, one must have a description K of who signed what (though some of this description may be folded into other variables, as in the signature scheme with message recovery). K has a certain Kolmogorov complexity, which is the minimum number of bits that are needed to convey the value of K. Therefore, the ultimate objective of this line of research is to minimize the amount of information in addition to K that is needed to verify the signature. Or, to put it another way, the ultimate objective is to find a signature scheme that is as close as possible to being "Kolmogorov-optimal."

There is a need for a scheme that adds at most a small constant number (i.e., a number of bits independent of n) of bits to the Kolmogorov lower-bound |K|.

SUMMARY

This section summarizes some features of the invention. Other features are described in the subsequent sections. The invention is defined by the appended claims which are incorporated into this section by reference.

Some embodiments of the present invention provide a signature scheme that allows multiple signers to sign multiple documents, but which is as close as possible to Kolmogorov-optimal. In some embodiments, called identity-based aggregated signatures, we meet this objective; the information needed to verify an identity-based aggregate signature is K, plus two constant-length "tags": the public key of a Private Key Generator and the actual identity-based aggregate signature. Aggregation is fairly flexible; for example, anybody can aggregate a collection of signatures that are formatted compatibly.

In addition, the present invention includes an identity-based multisignature scheme that has an even better security proof. (An identity-based multisignature scheme is essentially a (degenerate) identity-based aggregate signature scheme in which the different signers sign the same message.)

Furthermore, some embodiments of the present invention allow an identity-based aggregate signature in which the signers have different PKGs. The present invention also includes its novel components—some of those components being a method for producing identity-based secret keys to be used for generating identity-based aggregate signatures, a method for generating an identity-based signature that can be aggregated, a method for aggregating identity-based signatures (and possibly identity-based sub-aggregate signatures) into identity-based aggregate (or larger sub-aggregate) signatures, and a method for verifying identity-based aggregate signatures. The present invention also includes systems that implement such components, computer readable media which contain computer instructions and/or data structures for implementation of such components, and manufactured signals which incorporate such computer instructions and/or data structures.

The invention is not limited to the features and advantages described above. Other features are described below. The invention is defined by the appended claims.

DESCRIPTION OF SOME EMBODIMENTS

Figure 1:
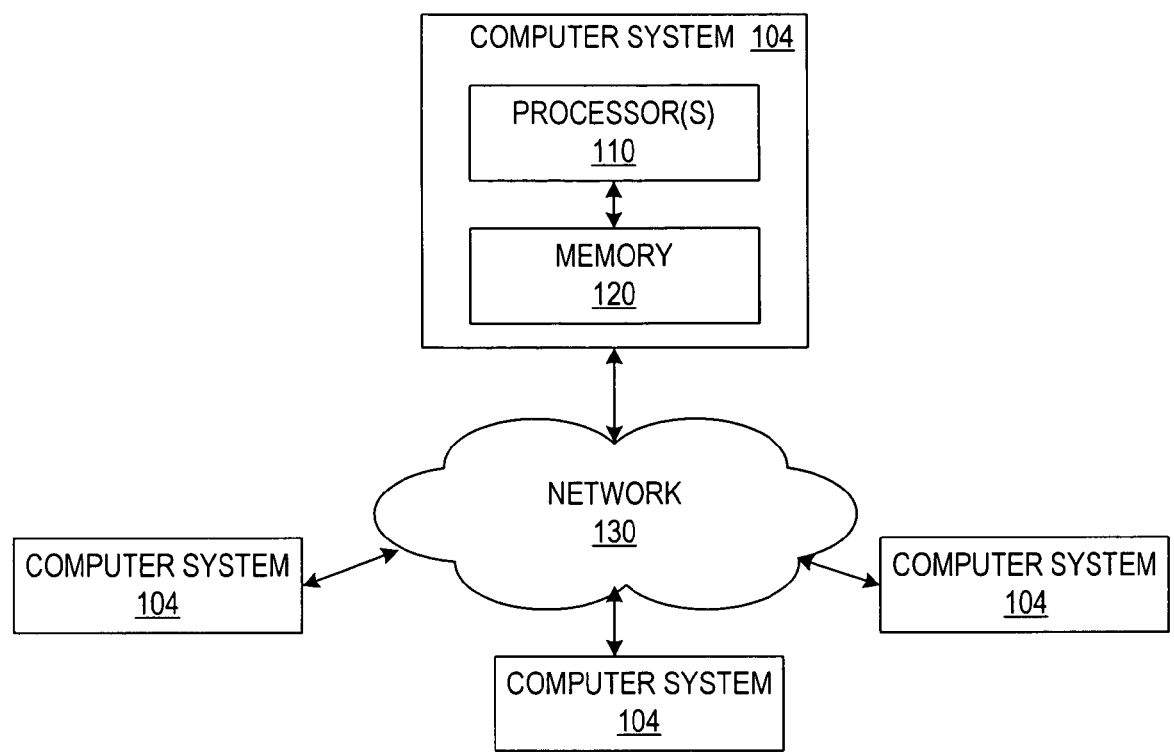
FIG. 1 shows a networked computer system suitable for implementing some embodiments of the present invention.

Some embodiments of the present invention provide methods and systems for implementing secure and efficient identity-based aggregate signature (and multisignature) schemes, along with various extensions and applications. First, we formalize, in general terms, what an identity-based aggregate signature scheme is.

1. Identity-Based Aggregate Signatures

Some aspects of an identity-based aggregate signature scheme are described in terms of both the scheme's performance characteristics and the scheme's security characteristics.

1.1 Performance Characteristics

Recall that the objective of identity-based aggregate signatures is to achieve bandwidth-efficiency that is close to Kolmogorov-optimal. Since it is possible that the description K of who signed what may grow sub-linearly with the number n of signers (for example, the description "for all signers, the i-th signer signs its index i" is independent of n, except possibly for a logarithmic dependence if the number n is made part of K), the amount of information needed to verify an identity-based aggregate signature preferably does not necessarily grow with n.

Remark: As mentioned above, in Lysyanskaya et al.'s aggregate signature scheme, the size of the aggregate signature S does actually grow linearly with n. But, despite this fact, their scheme is still considered to be an aggregate signature scheme, because S only grows by 1 or 2 bits with each additional signer (as opposed to 160 (or more) bits per signer for non-aggregate signature schemes). Although our definition of identity-based aggregate signatures of the present invention should not be construed to exclude this possibility of small linear growth, the bandwidth consumption of our preferred embodiment of identity-based aggregate signatures does not depend on n.

For previous aggregate signature schemes, in addition to a description K of who signed what, the verifier needs each of the n public signature verification keys ($VK_1, \ldots, VK_n$) for each of the n signers. For these previous aggregate signature schemes, the verifier cannot derive the values of ($VK_1, \ldots, VK_n$) from K (which includes a description of who the signers are). In other words, the verifier cannot figure out the signers' public keys from the signers' identities. Rather, each individual signer generates its own key pair ($SK_i, VK_i$) independently at random, in a way that does not necessarily depend on the signer's identity $ID_i$. Since each $VK_i$ is random from the perspective of a would-be verifier, the verifier cannot "guess" each $VK_i$; it must obtain each of the $VK_i$ separately before it can verify, making the total amount of verification information dependent on n.

In some embodiments, to achieve a signature scheme with no dependence on n, we do not allow each signer to generate its key pair independently at random. This leads to the notion of an identity-based signature scheme. In an identity-based signature scheme, a signer's public identity $ID_i$ acts as its public key. Note that the signers' identities ($ID_1, \ldots, ID_n$) may already be included in the description K of who signed what (K may depend on n in this case). A signer's secret signing key $SK_i$ is generated by a trusted authority, called a Private Key Generator (PKG), as a function of the signer's identity $ID_i$ and the PKG's secret key $SK_{PKG}$. A signer signs a document $D_i$ by inputting $(D_i, SK_i)$ into the signing algorithm, which outputs a signature $S_i$. A verifier verifies that $S_i$ is a valid signature on document $D_i$ by the signer with identity $ID_i$ by inputting $(S_i, D_i, ID_i, PK_{PKG})$ into a verification algorithm (where $PK_{PKG}$ is the PKG's public key), which outputs "0" or "1," depending on whether the signature is valid or invalid. Note that if all of the signers use the same PKG, then a verifier only needs one copy of the PKG's public key; the verifier does not need to obtain separate public keys $VK_i$ for each individual signer. So, for a (non-aggregate) identity-based signature scheme, the total information needed to verify is $|K|+|PK_{PKG}|+|S_1|+ \ldots +|S_n|$. In this case, it is the signatures $S_i$ that cause a dependence on n, rather than the signers' public verification keys $VK_i$ (for prior art aggregate signature schemes).

Remark: From the above description, one might ask: Why can't each signer simply set its public signature verification key $VK_i$ to be equal to $ID_i$, and generate its corresponding secret key by itself (without help from a PKG)? It turns out that, if we allow any specified "non-cryptographic" identity string $ID_i$ to act as a signer's public key ("non-cryptographic" in the sense that a signer does not have any secret cryptographic knowledge about this string (which would probably be the case if $ID_i$ is the signer's name or email address)), then it is an inevitable logical consequence that the signer's private key must be generated by someone other than the signer. The reason: if the signer could generate its own private key, then so could anyone else with equal computational power, since the signer is assumed not to have any "privileged" knowledge about his identity string. So, in some embodiments, the signer's private key is generated by a third party (or a federation of third parties)—call it a "PKG"—as a function of the signer's string $ID_i$ and information that is known only to the PKG—call it the PKG's private key $SK_{PKG}$.

Although the size of the verification information is dependent on n for both aggregate signatures and identity-based signatures, we can remove the dependence on n by combining the two notions. This is easier said than done. Existing aggregate signature schemes and existing identity-based signature scheme cannot simply be glued together to achieve this goal. Indeed, the existence of aggregate signature schemes and the existence of identity-based signature schemes certainly does not imply the existence of identity-based aggregate signature scheme. Here, let us state some of the properties and performance characteristics that we would like to obtain in at least some embodiments of an identity-based aggregate signature.

As in an identity-based signature, a signer's public identity $ID_i$ acts as its public key, and a signer's secret signing key $SK_i$ is generated by a trusted authority, called a Private Key Generator (PKG), as a function of the signer's identity $ID_i$ and the PKG's secret key $SK_{PKG}$. To generate an identity-based aggregate signature in which the signers with identities $(ID_1, \ldots, ID_n)$ sign documents $(D_1, \ldots, D_n)$, the respective signers apply their respective secret keys $SK_i$ in some fashion to their respective documents $D_i$. The size of the information needed to verify the identity-based aggregate signature S should be independent of n (or grow very slowly with n). Specifically, the verification information is $(K, S, PK_{PKG})$, where the sizes of S and $PK_{PKG}$ are independent of n.

The exact method by which the signers generate S may vary from scheme to scheme. In our preferred embodiment, the respective signers can generate their own identity-based signatures essentially independently of other signers' identity-based signatures. Afterwards, anybody can aggregate the identity-based signatures into an aggregate (as long as the various identity-based signatures are "compatible" in a certain way that will become clear later), and aggregates can be combined with other aggregates or individual signatures to create other aggregates. Alternatively, one might have a "sequential" (in the sense of Lysyanskaya et al.) identity-based aggregate signature scheme, in which the i-th signer aggregates its signature directly into the (i−1)-th signer's output to produce its own output; only the signers themselves can perform the aggregation. Although aggregation methods can vary, however, the outcome should be the same: a signature with nearly Kolmogorov-optimal verification information size.

1.2 Security Characteristics

A digital signature should be difficult to forge. In cryptography, this notion is formalized as security against existential forgery under an adaptive-chosen-message. This notion is typically defined in terms of a "game" played between a "challenger" and an "adversary"; roughly speaking, the adversary wins if it produces a valid forgery, subject to certain conditions we explain below. For our identity-based aggregate signature scheme, we give the adversary the power not only to choose the message that it will sign (i.e., forge), but also the group of identities that it wishes to attack. We formalize this game below.

Setup: The challenger C gives the adversary A the PKG's public key $PK_{PKG}$.

Queries: Proceeding adaptively, A may choose identities $ID_i$ and request the corresponding secret key $SK_i$. Also, given an identity-based aggregate signature $\sigma_{i-1}$ on $(PK_{PKG}, \{ID_i\}_{i=1}^{k-1}, \{D_i\}_{i=1}^{k-1})$, it may request an identity-based aggregate signature $\sigma_i$ on $(PK_{PKG}, \{ID_i\}_{i=1}^{k}, \{D_i\}_{i=1}^{k})$.

Response: For some $(PK_{PKG}, \{ID_i\}_{i=1}^{l}, \{D_i\}_{i=1}^{l})$, adversary A outputs an identity-based aggregate signature $\sigma_i$.

The adversary wins if the identity-based aggregate signature $\sigma_i$ is a valid signature on $(PK_{PKG}, \{ID_i\}_{i=1}^{l}, \{D_i\}_{i=1}^{l})$, and the signature is nontrivial—i.e., for some i, $1 \leq i \leq l$, A did not request the private key for $ID_i$ and did not request a signature including the pair $(ID_i, D_i)$.

Informally, the game above models the type of security we would expect from an identity-based aggregate signature scheme in real life. In real life, an adversary might be able to see a lot of legitimately-produced identity-based aggregate signatures; thus, we give the adversary the ability to request legitimate signatures in the game. In real life, the adversary may be able to dupe lots of signer's into giving him their private keys (or these signer's may "collude" with the adversary by giving him their private keys); thus, in the game, we give the adversary the ability to request private keys. Under these conditions, the best type of security we can hope for is that the adversary cannot produce an identity-based aggregate signature that was not already produced legitimately, and for which it does not know all of the signer private keys. This is what the game above models. Since the adversary's probability of breaking the scheme may depend on how much computational power (or time t) that the adversary has, and on how many queries it is permitted to make, we define security in terms of these variables.

Definition: An identity-based aggregate signature adversary A (t, $q_H$, $q_E$, $q_S$, $\epsilon$)-breaks an identity-based aggregate signature scheme in the above model if: A runs in time at most t; A makes at most $q_H$ hash function queries, at most $q_E$ secret key queries and at most $q_S$ signing queries; and Adv IBAggSig$_A$ is at least $\epsilon$.

Adv IBAggSig$_A$ is the probability that A "wins" the game.

The probability is over the coin tosses of the key-generation algorithm and of A.

Definition: An identity-based aggregate signature scheme is $(t, q_H, q_E, q_S, \epsilon)$-secure against existential forgery under an adaptively-chosen message adaptively-chosen target-identity attack if no adversary $(t, q_H, q_E, q_S, \epsilon)$-breaks it.

The preferred embodiment of the identity-based signature scheme of the present invention satisfies this strenuous security requirement in the widely-used "Random Oracle Model" (ROM). In the ROM, cryptographic hash functions are treated like perfectly random functions for the purpose of the security proof. One well-versed in the art will be quite familiar with the ROM.

2. Review of Pairings

The preferred embodiment of the identity-based signature scheme of the present invention uses a bilinear map called a "pairing." Over the past few years, pairings have been used in a variety of cryptographic schemes, and are now well-known. Typically, the pairing used is a modified Weil or Tate pairing on a supersingular elliptic curve or Abelian variety. However, we describe pairings and the related mathematics in a more general format here.

Let $G_1$ and $G_2$ be two cyclic groups of some large prime order q. The number $q > 3$, and in some embodiments $q > 2^{160}$. We write $G_1$ additively and $G_2$ multiplicatively.

Admissible pairings: We will call ê an admissible pairing if ê: $G_1 \times G_1 \rightarrow G_2$ is a map with the following properties:

1. Bilinear: $ê(aQ, bR) = ê(Q,R)^{ab}$ for all $Q, R \in G_1$ and all a, $b \in Z$ (Z is the set of all integers).

2. Non-degenerate: $ê(Q, R) \neq 1$ for some $Q, R \in G_1$.

3. Computable: There is an efficient algorithm to compute $ê(Q, R)$ for any $Q, R \in G_1$.

The present invention is not limited to admissible pairings, and in particular to computable pairings.

Notice that ê is symmetric—i.e., $ê(Q, R) = ê(R, Q)$ for all Q, $R \in G_1$ —since ê is bilinear and $G_1$ is a cyclic group. The invention is not limited to cyclic groups, however, and to symmetric pairings.

Computational Diffie-Heilman (CDH) Parameter Generator: We say that a randomized algorithm $PG_{CDH}$ is a CDH parameter generator if PG takes a security parameter $k > 0$, runs in time polynomial in k, and outputs the description of two groups $G_1$ and $G_2$ of the same prime order q and the description of an admissible pairing ê: $G_1 \times G_1 \rightarrow G_2$.

The security of the pairing-based schemes in this paper are based on the difficulty of the following problem:

Computational Diffie-Hellman Problem in $G_1$ ($CDH_{G1}$): Given P, aP, $bP \in G_1$, compute abP (for unknown randomly chosen a, $b \in Z/qZ$). Here qZ is the set of all integers divisible by q, and Z/qZ is the set of the residue classes modulo q.

We define the $CDH_{G1}$ assumption as follows.

$CDH_{G1}$ Assumption: If PG is a CDH parameter generator, the advantage $Adv_{PG}(B)$ that an algorithm B has in solving the $CDH_{G1}$ problem is defined to be the probability that the algorithm B outputs abP when the inputs to the algorithm are $G_1, G_2, ê, P, aP, bP$ where $(G_1, G_2, ê)$ is PG's output for large enough security parameter k, P is a random generator of $G_1$, and a, b are random elements of Z/qZ. The $CDH_{G1}$ assumption is that $Adv_{PG}(B)$ is negligible for all efficient algorithms B.

As mentioned previously, we are able (roughly speaking) to prove that the preferred embodiment of our identity-based aggregate signature scheme is secure against existential forgery under an adaptively-chosen message adaptively-chosen target-identity attack in the random oracle model, assuming that the $CDH_{G1}$ Assumption is true. The invention is not limited however to embodiments possessing this security property.

3. A Preferred Embodiment of an Identity-Based Aggregate Signature Scheme

First, we give some intuition regarding the scheme. There are a variety of identity-based signature schemes, including several based on pairings. It is not difficult to construct new identity-based signature schemes. However, existing identity-based signature schemes, as far as we know, all have something in common: signature generation is randomized, and the resulting identity-based signature is non-unique. Typically, an identity-based signature consists of two components: a "masked" form of the randomness, and a proof of knowledge after having committed to that randomness.

Aggregate signatures have been discovered only recently, and right now there are essentially only two approaches. In both schemes, signature generation is deterministic and the aggregate signature is unique. (In the LMRS scheme, i.e. the Lysyanskaya et al. scheme, each signer can introduce a bit of randomness, but each of these bits adds to the size of the aggregate signature.) It should not be surprising that existing aggregate signature schemes are deterministic; if each signer could introduce randomness into the signature, there would need to be some way to "aggregate the randomness."

In fact, aggregating the randomness is precisely what our identity-based aggregate signature scheme does. Each individual identity-based signature has the form $(S_{IDi,Mi} + r_i P', r_i P)$, where $S_{IDi,Mi}$ is computed deterministically from the signer's identity IDi and the message Mi that it signs, where (P, P') is some pair of points that is the same for all signers, and where $r_i$ is a scalar that the ith signer chooses randomly. The individual signatures can then be aggregated to get $$\left(\sum_i S_{IDi,Mi} + \left(\sum_i r_i\right) P', \left(\sum_i r_i\right) P\right);$$

notice how the random values of $r_i$ are simply aggregated together through addition, so that the size of the signature does not increase. Now, we describe the scheme more concretely. In the equations immediately below, P' is denoted as $P_w$. The letters M (message) and D (document) are used interchangeably throughout. "Message" and "document" are synonymous as used herein.

Setup: The Private Key Generator (PKG) generates parameters and keys essentially as it does in previous pairing-based schemes. Specifically, it:

1. generates groups $G_1$ and $G_2$ of some prime order q and bilinear non-degenerate pairing ê: $G_1 \times G_1 \rightarrow G_2$ (this may be an admissible pairing; in some embodiments, $q > 3$; in some embodiments, $G_1$ is an elliptic curve group or some other type of group, and $q > 2^{160}$);

2. chooses an arbitrary generator $P \in G_1$;

3. picks a random $s \in Z/qZ$ and sets $Q = sP$;

4. chooses cryptographic hash functions $H_1, H_2$: $\{0, 1\}^* \rightarrow G_1$ and $H_3$: $\{0, 1\}^* \rightarrow Z/qZ$.

The PKG's public key is $PK_{PKG} = (G_1, G_2, ê, P, Q, H_1, H_2, H_3)$. The PKG's secret $SK_{PKG}$ is $s \in Z/qZ$.

Private key generation: The client with identity $ID_i$ receives from the PKG the values of $sP_{i,j}$ for $j \in \{0, 1\}$, where $P_{i,j} = H_1(ID_i, j) \in G_1$.

Individual Signing: The first signer chooses a string w that it has never used before. Each subsequent signer checks that it has not used the string w chosen by the first signer. (Alternatively, different signers may arrive at the same w independently—e.g., if they issue signatures according to a pre-established schedule; for example, the signatures are generated at some pre-arranged time and w is defined by that time; thus, for example, w can be defined by the hours and minutes of the signature generation time.) To sign a document $D_i$, the signer with identity $ID_i$:

1. computes $P_w = H_2(w) \in G_1$;
2. computes $c_i = H_3(D_i, ID_i, w) \in \mathbb{Z}/q\mathbb{Z}$;
3. generates random $r_i \in \mathbb{Z}/q\mathbb{Z}$;
4. computes its signature $(w, S'_i, T'_i)$, where $$S'_i = r_i P_w + s P_{i,0} + c_i s P_{i,1} \text{ and } T'_i = r_i P. \quad (1)$$

Aggregation: Anyone can aggregate a collection of individual signatures that use the same string w. For example, individual signatures $(w, S'_i, T'_i)$ for $1 \leq i \leq n$ can be aggregated into $(w, S_n, T_n)$, where $$S_n = \sum_{i=1}^{n} S'_i \text{ and } T_n = \sum_{i=1}^{n} T'_i.$$

Our security proof does not permit the aggregation of individual (or aggregate) signatures that use different w's. However, signatures using the same w can be aggregated even if the signers have different PKGs with different secret keys as long as the PKGs use the same parameters $G_1, G_2, \hat{e}, P, H_2$). Details will be given later.

Verification: Let $(w, S_n, T_n)$ be the identity-based aggregate signature (where n is the number of signers). The verifier checks that:

$$\hat{e}(S_n, P) = \hat{e}(T_n, P_w) \hat{e}\left(Q, \sum_{i=1}^{n} P_{i,0} + \sum_{i=1}^{n} c_i P_{i,1}\right), \quad (2)$$

where $P_{i,j} = H_1(ID_i, j)$, $P_w = H_2(w)$ and $c_i = H_3(D_i, ID_i, w)$, as above.

Remark 3A (section 3, remark A): Why not just set the signature to be $sP_{i,0} + c_i s P_{i,1}$?: because after two signatures, an adversary will likely be able to recover the values of $sP_{i,0}$ and $sP_{i,1}$ using linear algebra. The purpose of the one-time-use $P_w$ is to disturb this linearity, while providing a place where all the signers can "aggregate their randomness."

Remark 3B: In the scheme above, each signer is only allowed one identity-based signature with a single value of w. However, the scheme can easily be modified to allow each signer to produce k individual identity-based signatures with a single value of w, by changing private key generation so that the client with identity $ID_i$ receives from the PKG the values of $sP_{i,j}$ for $j \in [0, k]$, where $P_{i,j} = H_1(ID_i, j) \in G_1$. To sign, the signer computes $c_{ij} = H_3(D_i, ID_i, w, j)$ for $1 \leq j \leq k$, and sets:

$$S'_i = r_i P_w + s P_{i,0} + \sum_{j=1}^{k} c_{ij} s P_{i,j} \text{ and } T'_i = r_i P; \quad (3)$$

its signature, as before, is $(w, S'_i, T'_i)$. The individual identity-based signatures can be aggregated using the same summations as before.

In some embodiments, the term $sP_{i,0}$ is multiplied by some coefficient $c_{i0}$ which may or may not depend on $D_i, ID_i, w$. For example, in some embodiments, $c_{i0} = H_3(D_i, ID_i, w, -j)$. At least one of the $c_{ij}$ (j=0, ..., k) coefficients depends on the document $D_i$. Some or all of these coefficients are functions of $ID_i$.

Remark: The identity-based aggregate signature scheme is exceptionally bandwidth-efficient. The values w, $S_n$ and $T_n$ can each be taken to be quite short (e.g., 160 bits), while achieving sufficient security. With the possible exception of the description K of who signed what, the size of the total information needed to verify the identity-based aggregate signature—specifically, the size of ($PK_{PKG}$, w, $S_n$, $T_n$)—is constant-length (i.e., independent of n), and quite small in practice.

Remark: In terms of computational efficiency, this scheme is actually more efficient than the Boneh-Gentry-Lynn-Shacham (BGLS) scheme. Like the BGLS scheme, the total computational work for verification is linear in the number of signers, but the BGLS signature scheme requires n+1 pairing computations, which tend to be quite computationally-intensive, while the above identity-based aggregate signature scheme only requires 3 pairing computations (and n scalar multiplications, which tend to be comparatively computationally-lightweight).

4. The Different Components of the Above Embodiment

Here, we split up the above identity-based aggregate signature scheme into its various novel components, including a private key generation component, a signing component, an aggregation component, and a verification component. Each of these components can be implemented with circuitry, using for example a computer system 104 of FIG. 1. Each system 104 may also be an embedded system, e.g. part of a mobile telephone. Each system 104 may or may not be a distributed system. A system 104 may have a processor or processors 110 and a memory system 120 which may include a semiconductor memory, a magnetic disk or tape, or other kinds of computer-readable media or storage, permanent or removable, known or to be invented. The memory may contain computer instructions for causing the computer system 104 to implement the functions of the components described above such as key generation, signing, aggregation and verification. Different computer systems can implement different components, but this is not necessary. Memory 120 also stores data structures such as keys and signatures as needed for the various components. Computer systems 104 exchange information via a computer network 130. For example, a computer system 104 implementing the key generation component for a PKG can send private keys to a signing component implemented at another system 104 via network 130. The signatures can be sent to a computer system 104 implementing the verification component via the network 130. Network 130 may include a combination of networks including LANs (local area networks), WANs (wide area networks), and including, for example, mobile telephone networks and other network types, known or to be invented.

The private key generation component, which can be implemented using one or more of systems 104, takes as input an identity string and a secret key; it outputs a private identity-based signing key. In the identity-based aggregate signature scheme above, each identity-based private key consists of more than one point (e.g., the two points $sP_{i,0}$ and $sP_{i,1}$, or (more generally) k such points to allow a single signer to produce k-1 signatures with the same value of w), whereas in previous identity-based schemes that use pairings, such as Boneh and Franklin's identity-based encryption scheme (described at the Crypto 2001 conference), the identity-based private key consists of only one point (e.g., $sP_i$, where $P_i = H_1(ID_i)$). This particular method of private key generation is currently unique to the preferred embodiment above of identity-based aggregate signatures, and it is important in the security proof. This is the only currently known method for generating identity-based secret keys that enables an identity-based aggregate signature scheme.

The signing component takes as input an identity-based secret key $SK_i$, a document $D_i$, and an identity-based aggregate signature $\sigma_{i-1}$ for $(PK_{PKG}, \{ID_i\}_{i=1}^{k-1}, \{D_i\}_{i=1}^{k-1})$; it outputs an identity-based aggregate signature $94_i$ on $(PK_{PKG}, \{ID_i\}_{i=1}^{k}, \{D_i\}_{i=1}^{k})$. It may be the case that $\{ID_i\}_{i=1}^{k-1}, \{D_i\}_{i=1}^{k-1}$ is an empty set, in which case the signing algorithm simply outputs an individual identity-based signature. In the preferred embodiment above, signers subsequent to the first signer only need to know which value of w they should use before constructing their own identity-based signature; they do not need to know previous signers' values for $S'_i$ and $T'_i$, nor do they need to know any aggregation of these values. This is the only currently known method for generating identity-based signatures that allows the identity-based signatures to be generated first and aggregated later if desired. The signing component may, for example, send its output directly to an aggregation component system 104 via the network 130 (if the aggregation component and the signing component are implemented at different systems 104).

The aggregation component takes as input a set (of cardinality greater than 1) that may include individual identity-based signatures or identity-based aggregate signatures. If the members of this set are compatible (for example, in the scheme described above, if these signatures use the same value of w), then the aggregation component aggregates the signatures in the set into a single signature.

The verification component takes as input a description K of who signed what, along with an identity-based aggregate signature S, and the public keys of one or more PKGs; it outputs a bit (e.g., "0" or "1") indicating whether the identity-based aggregate signature cryptographically "proves" that each of the indicated signers indeed signed each of their respective documents.

5. The Security of the Above Preferred Embodiment

Before formally proving the security of the scheme, we provide some intuition for how an algorithm B can solve a computational Diffie-Hellman problem—i.e., compute sP' from P, sP, and P'—by interacting with an algorithm A that breaks our identity-based aggregate signature scheme. During the interaction, B must either respond correctly to A's queries, or abort. A can make several types of queries:

1. $H_1$ and Extraction Queries: A can ask for the identity-based private keys $sP_{i,j}$ for $j \in \{0, 1\}$ that correspond to identity $ID_i$. B handles these queries through its control of the $H_1$ oracle. In particular, it usually generates $P_{i,j}$ in such a way that it knows $b_{i,j}=\log_P P_{i,j}$; then, it can compute $sP_{i,j}=b_{i,j}sP$. However, B occasionally sets $P_{i,j}=b_{i,j}P+b'_{i,j}P'$. In this case, B cannot respond to an extraction query on $ID_i$, but if A later chooses $ID_i$ as a target identity, A's forgery may help B solve its computational Diffie-Hellman problem.

2. $H_2$ queries: B, through its control over the $H_2$ oracle, will usually generate $P_w$ in such a way that it knows $d_w=\log_P P_w$, but occasionally generates $P_w$ so that it knows $c_w=\log_P P_w$ instead.

3. $H_3$ and signature queries: B's control over the $H_2$ and $H_3$ oracles helps it to respond to signature queries regarding the tuple $(ID_i, M_j, w_k)$ when it cannot even extract the private key corresponding to $ID_i$. How can B generate valid and consistent values of $P_{i,0}, P_{i,1}, P_{wk}, d_{i,j,k}=H_3(ID_i, M_j, w_k), S'_i = rP_{wk}+sP_{i,0}+d_{ijk} sP_{i,1}$ and $T'_i=rP$ in such a situation? In particular, how can it generate $S'_i$, which seems to require that B know sP'? If B knows $\log_{P'} P_w$, it can compute the value of r' such that r'sP$_w$ "cancels out" the multiple of sP' that comes from the final two terms; it then sets $T'_i$ to be r'sP. If B doesn't know $\log_{P'}$ Pw it has one more trick it can use; occasionally, B' sets $d_{ijk}$ to be the unique value in $Z/qZ$ that causes the multiples of sP' in the final two terms to cancel. In this case, B can produce a valid signature. Once this unique value is revealed for a given $ID_i$, it cannot use this trick again (otherwise, the simulation will not be convincing to A).

If B is lucky, its simulation does not abort and A produces a forgery on a tuple $(ID_i, M_j, w_k)$ for which it does not know $\log_P P_{i,j}$, does know $\log_P P_{w_k}$, and where $d_{ijk}$ was not chosen using the trick above. In this case, A's forgery gives B the value of sP' with extremely high probability.

By the following theorem, our identity-based aggregate signature scheme is secure.

Theorem 1. Let A be an IDAggSig-CMA adversary that $(t, q_{H3}, q_E, q_S, \epsilon)$-breaks the identity-based aggregate signature scheme. Then, there exists an algorithm B that solves $CDH_{G1}$ in time $O(t)$ with probability at least $\epsilon/1024q_Eq_S(q_{H3}-q_S)$.

Proof: The game begins with the challenger running PG to obtain groups $G_1$ and $G_2$ and an admissible pairing ê. The challenger generates $(P, sP, P') \in G_1^3$, and sends $(G_1, G_2, ê, P, Q, P')$ to B. B tries to compute $sP' \in G_1$ (where $Q=sP$), interacting with A as follows.

Setup: B gives A the system parameters $(G_1, G_2, ê, P, Q, H_1, H_2, H_3)$, where the $H_i$'s are random oracles controlled by B.

Hash Queries: A can make an $H_1$-query, $H_2$-query, or $H_3$-query at any time. B gives identical responses to identical queries, maintaining lists relating to its previous hash query responses for consistency. B also maintains $H_3$-list2, which addresses certain special cases of the $H_3$ simulation. B responds to A's $H_1$-query on $(ID_{i,j})$ as follows:

For A's $H_1$-query on $(ID_{i,j})$ for $j \in \{0, 1\}$:

1. If $ID_i$ was in a previous $H_1$-query, B recovers $(b_{i0}, b'_{i0}, b_{i1}, b'_{i1})$ from its $H_1$-list.

2. Else, B generates a random $H_1$-coin$_i \in \{0, 1\}$ so that $\Pr[H_1\text{-coin}_i=0]=\delta_1$ for $\delta_1$ to be determined later. If $H_1$-coin$_i=0$, B generates random $b_{i0}, b_{i1}, \in Z/qZ$ and sets $b'_{i0}=b'_{i1}=0$; else, it generates random $b_{i0}, b'_{i0}, b_{i1}, b'_{i1} \in Z/qZ$. B logs $(ID_i, H_1\text{-coin}, b_{i0}, b'_{i0}, b_{i1}, b'_{i1})$ in its $H_1$-list.

3. B responds with $H_1(ID_i, j)=P_{i,j}=b_{i,j}P+b'_{i,j}P'$.

For A's $H_2$-query on $w_k$:

1. If $w_k$ was in a previous $H_2$-query, B recovers $c_k$ from its $H_2$-list.

2. Else, B generates a random $H_2$-coin$_k \in \{0, 1\}$ so that $\Pr[H_2\text{-coin}_k=0]=\delta_2$ for $\delta_2$ to be determined later. B generates a random $ck \in (Z/qZ)^*$. It logs $(w_k, H_2\text{-coin}_k)$ in its $H_2$-list.

3. If $H_2$-coin$_k=0$, B responds with $H_2(w_k)=P_{wk}=c_kP'$; otherwise, it responds with $H_2(w_k)=P_{wk}=c_kP$.

For A's $H_3$-query on $(ID_i, M_j, w_k)$:

1. If $(ID_i, M_j, w_k)$ was in a previous $H_3$-query, B recovers $d_{ijk}$ from its $H_3$-list.

2. Else, B runs an $H_1$-query on $(ID_i, 0)$ to recover $b'_{i0}$ and $b'_{i1}$ from its $H_1$-list. B generates a random $H_3$-coin$_{ijk} \in \{0, 1\}$ so that $\Pr[H_3\text{-coin}_{ijk}=0]=\delta_3$ for $\delta_3$ to be determined later.

(a) If $H_1$-coin$_i=1$, $H_2$-coin$_k=1$, and $H_3$-coin$_{ijk}=0$, B checks whether $H_3$-list2 contains a tuple $(ID_i, M_{j'}, w_{k'})\neq(ID_i, M_j, w_k)$ with $ID_{i'}=ID_i$. If so, B aborts. If not, it puts $(ID_i, M_j, w_k)$ in $H_3$-list2 and sets $d_{ijk}=-b'_{i0}/b'_{i1}(\text{mod} q)$.

(b) If $H_1$-coin$_i=0$, $H_2$-coin$_k=0$, or $H_3$-coin$_{ijk}=1$, B generates a random $d_{ijk} \in (Z=qZ)^*$.

(c) B logs $(ID_i, M_j, w_k, H_3\text{-coin}_{ijk}, d_{ijk})$ in its $H_3$-list.

3. B responds with $H_3(ID_i, M_j, w_k)=d_{ijk}$.

Extraction Queries: When A requests the private key corresponding to $ID_i$, B recovers $(H_1\text{-coin}_i, b_{i,0}, b'_{i0})$. If $H_1$-coin$_i=0$, B responds with $(sP_{i,0}, sP_{i,1})=(b_{i0}Q, b_{i1}Q)$. If $H_1$-coin$_i=1$, B aborts.

Signature Queries: When A requests a (new) signature on $(ID_i, M_j, w_k)$, B first confirms that A has not previously requested a signature by $ID_i$ on $w_k$ (otherwise, it is an improper query). Then, B proceeds as follows:

1. If $H_1$-$coin_i$=$H_2$-$coin_k$=$H_3$-$coin_{ijk}$=1, B aborts.

2. If $H_1$-$coin_i$=0, B generates random $r \in Z/qZ$ and outputs the signature $(w_k, S'_i, T'_i)$, where $S'_i = sP_{i,0} + d_{ijk}sP_{i,1} + rP_{wk} = b_{i0}Q + d_{ijk}b_{i1}Q + rP_{wk}$ and $T'_i = rP$.

3. If $H_1$-$coin_i$=1 and $H_2$-$coin_k$=0, B generates random $r \in Z/qZ$ and outputs the signature $(w_k, S'_i, T'_i)$, where $$S'_i = sP_{i,0} + d_{ijk}sP_{i,1} + (r - (b'_{i0} + d_{ijk}b'_{i1})sc_k^{-1})P_{wk}$$
$$= b_{i0}Q + b'_{i0}sP' + d_{ijk}b_{i1}Q + d_{ijk}b'_{i1}sP' + rc_kP' - (b'_{i0} + d_{ijk}b'_{i1})sP'$$
$$= b_{i0}Q + d_{ijk}b_{i1}Q + rc_kP', \text{ and}$$

$$T'_i = (r - (b'_{i0} + d_{ijk}b'_{i1})sc_k^{-1})P$$
$$= rP - (b'_{i0} + d_{ijk}b'_{i1})c_k^{-1}Q.$$

4. If $H_1$-$coin_i$=$H_2$-$coin_k$=1 and $H_3$-$coin_{ijk}$=0, B generates random $r \in Z/qZ$ and outputs the signature $(w_k, S'_i, T'_i)$, where $T'_i = rP$, and $$S'_i = sP_{i,0} + d_{ijk}sP_{i,1} + rP_{wk}$$
$$= b_{i0}Q + b'_{i0}sP0 + d_{ijk}b_{i1}Q - (b'_{i0}/b'_{i1})b'_{i1}sP' + rc_kP$$
$$= b_{i0}Q + d_{ijk}b_{i1}Q + r_{ck}P.$$

Below, we analyze various aspects of the simulation. In the analysis, assume that A makes no redundant queries and that A must make an $H_3$ query on a tuple $(ID_i, M_j, w_k)$ before making a signature query on it. Let E represent the set of extraction query responses that B has made up to specified point in the simulation; similarly, let S be the set of signature query responses, and $H_i$ be the set of $H_i$ query responses for $i \in \{1, 2, 3\}$. Let $E_{1,*,*}$ be the event that $H_1$-$coin_i$=1; here, "*" means that $H_2$-$coin_k$ and $H_3$-$coin_{ijk}$ may each be 0 or 1. Let $E_{1,1,*}$, $E_{1,1,1}$ and $E_{1,1,0}$ denote their corresponding events in the obvious way.

Perfect Simulation: We claim that, if B does not abort, A's view is the same as in the "real" attack. In the "real" attack, each of the hash functions $H_i$ behave like random functions. Then, given the values of $P_{i,j}$=$H_1(ID_{i,j})$, $P_{wk}$=$H_2(w_k)$, and $d_{ijk}$=$H_3(ID_i, M_j, w_k)$, a signature is chosen uniformly from the set $\{(w_k, S'_i, T'i): S_i = sP_{i,0} + d_{ijk}sP_{i,1} + rP_w, T'_i = rP, r \in Z/qZ\}$. Similarly, in the simulation, a signature is chosen uniformly from the set $\{(w_k, S'_i, T'_i): S'_i = sP_{i,0} + d_{ijk}sP_{i,1} + rP_w, T'_i = rP, r \in Z/qZ\}$ given values of $P_{i,j}$=$H_1(ID_{i,j})$, $P_{wk}$=$H_2(w_k)$, and $d_{ijk}$=$H_3(ID_i, M_j, w_k)$. Also, the $H_i$ behave like random functions—i.e., they are one-to-one and the outputs are chosen with uniform distribution. The only case in which this may not be obvious is when $H_1$-$coin_i$=$H_2$-$coin_k$=1 and $H_3$-$coin_{ijk}$=0. In this case, unless A has made a previous $H_3$ query on $(ID_i, M_{j'}, w_{k'}) \neq (ID_i, M_j, w_k)$ for which $H_1$-$coin_i$=$H_2$-$coin_{k'}$=1 and $H_3$-$coin_{ij'k'}$=0 (in which case B aborts), B sets $H_3(ID_i, M_j, w_k)$ to be $-b'_{i0}/b'_{i1}$, (modq) (rather than choosing the $H_3$ output uniformly randomly).

However, the value of $-b'_{i0}/b'_{i1}$ (modq) is itself uniformly random. More specifically, given A's view up until the $H_3$ query on $(ID_i, M_j, w_k)$—namely, the sets E, S, and $\{H_i\}$—we have that $Pr[H_3(ID_i, M_j, w_k)=c|E, S, H_1, H_2, H_3, E_{1,1,0}]=1/q$ for every $c \in Z/qZ$, as long as B does not abort. Most surprisingly, the value $H_3(ID_i, M_j, w_k)=-b'_{i0}/b'_{i1}$ (modq) is independent of an $H_1$ query response on $ID_i$ even though $H_1(ID_{i,j})=b_{ij}P+b'_{ij}P'$, since, given $H_1(ID_i, 0)=b_{i0}P+b'_{i0}P'$, the pairs $(b_{i0}, b'_{i0})$ with $b'_{i0}$=$\log_{P'}(H_1(ID_i,0))$=$b_{i,0}\log_{P'}(P)$ are equally likely. It should be clear that the value of $H_3(ID_i, M_j, w_k)$ is also independent of $H_1$ queries on identities other than $ID_i$, all extraction query responses (since they are completely dependent on $H_1$ query responses), all $H_2$ queries, all $H_3$ queries on tuples other than $(ID_i, M_j, w_k)$ (again, assuming B does not abort), and all signature queries on tuples other than $(ID_i, M_j, w_k)$.

Probability that B Does Not Abort: B aborts in three situations:

A makes an extraction query on an $ID_i$ for which $H_1$-$coin_i$=1;

A makes a signature query on a tuple $(ID_i, M_j, w_k)$ for which $H_1$-$coin_i$=$H_2$-$coin_k$=$H_3$-$coin_{ijk}$=1;

A makes two $H_3$-queries tuples $(ID_i, M_j, w_k)$ and $(ID_i, M_{j'}, w_{k'})$ for which $H_1$-$coin_i$=1, and $H_2$-$coin_k$=$H_2$-$coin_{k'}$=1 and $H_3$-$coin_{ijk}$=$H_3$-$coin_{ij'k'}$=0.

Below, we analyze the probabilities of each of these situations.

First, consider the probability that, at a given point in the simulation, an extraction query on $ID_i$ causes B to abort—i.e., $Pr[E_{1,*,*}|E, S, H_1, H_2, H_3]$, where the probabilities $(\delta_1, \delta_2, \delta_3)$ of the respective coins are implicit. From Bayes's Rule, we get:

$Pr[E_{1,*,*}|E, S, H_1, H_2, H_3]=(Pr[E, S, H_1, H_2, H_3|E_{1,*,*}]$
$Pr[E_{1,*,*}])/(Pr[E, S, H_1, H_2, H_3])$

We claim that $Pr[E, S, H_1, H_2, H_3|E_{1,*,*}] \leq Pr[E, S, H_1, H_2, H_3]$ which leads to the conclusion that $Pr[E_{1,*,*}|E, S, H_1, H_2, H_3]$ is at most $Pr[E_{1,*,*}]=1-\delta_1$. In the simulation, the computation of $H_2$ is completely independent of the values of all $H_1$-coins. Since the output of $H_1(ID_i)$ is uniformly random regardless of the value of $H_1$-$coin_i$, $H_1$ outputs are also independent of $H_1$ coins. Furthermore, since no extraction queries E relate to $ID_i$, E is also independent of $E_{1,*,*}$. Finally, any signature query responses or $H_3$ query responses relating to identities other than $ID_i$ are independent of $E_{1,*,*}$. Thus, our claim above is equivalent to the claim that $Pr[S_i, H_{3,i}|E_{1,*,*}] \leq Pr[S_i, H_{3,i}]$, where $S_i$ and $H_{3,i}$ denote the subsets of S and $H_3$ that relate to $ID_i$. However, this claim is clearly true, since B never aborts during a signature or $H_3$ query on $(ID_i, M_j, w_k)$ when $H_1$-$coin_i$=0; B only aborts (occasionally) when $H_1$-$coin_i$=1. Thus, the probability that B will not abort during an extraction query if A is permitted to make at most $q_E$ extraction queries is at least $\delta^{q_E}_1$.

In considering the third situation, assume that A must perform an $H_3$ query on a tuple before performing a signature query on it. Similarly to the first situation, we claim that $Pr[E, S, H_1, H_2, H_3|E_{1,1,0}] \leq Pr[E, S, H_1, H_2, H_3]$, which implies that $Pr[E_{1,1,0}|E, S, H_1, H_2, H_3]$ is at most $Pr[E_{1,1,0}]=(1-\delta_1)(1-\delta_2)\delta_3$. For reasons similar to above, $H_1$ and $H_2$ responses are independent of coin values, extraction responses unrelated to $ID_i$ are independent of $E_{1,1,0}$, and the probability that B can respond successfully to an extraction query on $ID_i$ (given that $H_1$-$coin_i$=1) is 0. Moreover, everything in S, $H_3$ is independent of $H_3$-$coin_{ijk}$=0 (since we have excluded the possibility of prior signature queries on $(ID_i, M_j, w_k)$), and any signature or $H_3$ query that includes neither $ID_i$ nor $w_k$ is independent of $E_{1,1,*}$. Thus, our claim above is equivalent to the claim that *$Pr[S_{iVk}, H_{3,iVk}, |E_{1,1,*}] \leq Pr[S_{ivk}, H_{3,iVk}]$, where $S_{ivk}$ and $H_{3,iVk}$ denote the subsets of S and $H_3$ that include $ID_i$ or $w_k$. But, again, this claim is clearly true, since B has a higher probability of aborting during a signature or $H_3$ query on $(ID_{i'}, M_{j'}, w_{k'})$ when it is certain a priori that $H_1$-$coin_i$=1 or $H_2$-$coin_k$=1.

To bound the probability of the third situation, we compute the probability that there are not two or more occurrences of $H_1\text{-coin}_i=H_2\text{-coin}_k=1$ and $H_3\text{-coin}_{ijk}=0$ for any $ID_i$. Let $p_{H3}=\Pr[E_{1,1,0}]$. Suppose A would make (if B did not abort) $q_{H3,i} H_3$ queries that include $ID_i$. The probability that there are zero occurrences of $H_1\text{-coin}_i=H_2\text{-coin}_k=1$ and $H_3\text{-coin}_{ijk}=0$ is at least $(1-p_{H3})^{q_{H3,i}}$. And the probability that there is one occurrence is at least $q_{H3,i} p_{H3} (1-p_{H3})^{q_{H3,i}-1}$. The sum of these two probabilities is $(1+(q_{H3,i}-1)p_{H3})(1-p_{H3})^{q_{H3,i}-1} = (1+(p_{H3}q_{H3,i})/(1-p_{H3}))((1-P_{H3})^{q_{H3,i}})$. Thus, the probability that B does not abort in any $H_3$-query is at least $\pi_i (1+p_{H3}q_{H3,i})/(1-P_{H3})((1-p_{H3})^{q_{H3,i}})$. One can show that this probability is at least $(1+(p_{H3}q_{H3})/((1-p_{H3}))(1-p_{H3})^{q_{H3}} > (1-p_{H3})^{q_{H3}}$, where $q_{H3}$ is the total number of $H_3$-queries.

Finally, we lower bound the probability that B does not abort during a signature query. In the analysis above, we found that all query responses only decrease (or do not affect) the conditional probability of $E_{1,1,0}$. Here, the situation is the same, with the exception of one type of query: an $H_3$ query on $(ID_i, M_j, w_k)$. If B successfully responds to an $H_3$-query on $(ID_i, M_j, w_k)$, it reduces the probability that $H_1\text{-coin}_i=H_2\text{-coin}_k=1$ and $H_3\text{-coin}_{ijk}=0$, and correspondingly increases the conditional probabilities of all other coin combinations. However, even if we were certain that it is not the case that $H_1\text{-coin}_i=H_2\text{-coin}_k=1$ and $H_3\text{-coin}_{ijk}=0$, this certainty only increases the conditional probability of $H_1\text{-coin}_i=H_2\text{-coin}_k=H_3\text{-coin}_{ijk}=1$ by a ratio of $1/(1\ p_{H3})$. So, the probability that B does not abort during any single signature query is at least $1-(1-\delta_1)(1-\delta_2)(1-\delta_3)/(1-p_{H3})=(1-(1-\delta_1)(1-\delta_2)(1-2\delta_3))/(1-p_{H3})$. The probability that A does not abort during any of the up to $q_S$ signature queries is at least $(1-(1-\delta_1)(1-\delta_2)(1-2\delta_3))^{q_S}/(1-p_{H3})^{q_S}$.

In all, the probability that B does not abort is at least:

$$\delta^{q_E}_1 \cdot (1-(1-\delta_1)(1-\delta_2)\delta_3)^{q_{H3}-q_S} \cdot (1-(1-\delta_1)(1-\delta_2)(1-2\delta_3))^{q_S} \geq \delta^{q_E}_1 \cdot (1-\delta_3)^{q_{H3}-q_S} \cdot (\delta_2)^{q_S}.$$

B's Success Probability If It Does Not Abort: B will succeed—i.e., it will be able to compute $sP'$ (solving an instance of computational Diffie-Hellman)—if A produces a valid aggregate signature forgery on a tuple $(ID_i, M_j, w_k)$ for which $H_1\text{-coin}_i=H_2\text{-coin}_k=H_3\text{-coin}_{ijk}=1$ and where $H_3(ID_i, M_j, w_k) \neq b'_{i0}/b'_{i1} \pmod{q}$.

In this case, A's forgery has the form $(S_l, T_l)$, where $T_l = rP$ and $S_l = rP_{wk} +$ $$\sum_{i'=1}^{l} sP_{i',0} + c_{i'} sP_{i',1},$$

where we let $c_i = H_3(ID_i, M_j, w_k)$ be the hash of the tuple "signed" by the entity with identity $ID_i$. Since $H_2\text{-coin}_k = 1$, B knows the discrete logarithm $c_k$ of $P_{wk}$ with respect to P. It can therefore compute:

$$S_l - c_k T_l = \sum_{i'=1}^{l} sP_{i',0} + c_{i'} sP_{i',1}$$

$$= s\left(\sum_{i'=1}^{l} b_{i',0} P + b'_{i',0} P' + c_{i'}(b_{i',1} P + b'_{i',1} P')\right)$$

$$= s\left(\sum_{i'=1}^{l} (b_{i',0} + c_{i'} b_{i',1})\right) P + s\left(\sum_{i'=1}^{l} (b'_{i',0} = c_{i'} b'_{i',1})\right)$$

If $H_1\text{-coin}_i = H_3\text{-coin}_{ijk} = 1$ for at least one of the signed tuples, then the probability that $$\sum_{i'=1}^{l} (b'_{i',0} + c_{i'} b'_{i',1}) \neq 0 \text{ is } 1-1/q; \text{ if } \sum_{i'=1}^{l} (b'_{i',0} + c_{i'} b'_{i',1}) \neq 0,$$

B can easily derive $sP'$ from the expression above.

It remains to compute a lower bound on $\Pr[E_{1,1,1}|E, S, H_1, H_2, H_3]$. For reasons similar to above, this probability is independent of $H_1$ and $H_2$. This probability is also independent of all extraction queries on $ID_{i'} \neq ID_i$, and A is not permitted to make an extraction query on its target identity $ID_i$. Thus, $\Pr[E_{1,1,1}|E, S, H_1, H_2, H_3] = \Pr[E_{1,1,1}|S, H_3]$. From Bayes's Rule, we get:

$\Pr[E_{1,1,1}|S, H_3] = (\Pr[S, H_3|E_{1,1,1}] \cdot \Pr[E_{1,1,1}])/(\Pr[S, H_3])$ The value of $\Pr[S, H_3|E_{1,1,1}]/\Pr[S, H_3]$ is equal to the probability that B does not abort during $S \cup H_3$ given a priori knowledge that $H_1\text{-coin}_i = H_2\text{-coin}_k = H_3\text{-coin}_{ijk} = 1$, over the probability that B does not abort during the set of queries $S \cup H_3$ without such a priori knowledge. This ratio is equal to at least the former probability, which analyze below.

We wish to find a lower bound on $\Pr[E_{1,1,1}|S, H_3]$; so, what signature and $H_3$ queries maximize the probability that B aborts? In terms of $H_3$ queries, we assume that A makes $H_3$ queries on every tuple for which it makes a signature query. Aside from these, the probability that B aborts is maximized by queries on $(ID_i, M_{j'}, w_k)$ for $j' \neq j$. In terms of signature queries, A cannot, of course, perform a signature query on $(ID_i, M_j, w_k)$. However, it can perform (at most) one signature query that includes $ID_i$ and $w_k$: $(ID_i, M_{j'}, w_k)$. To maximize the probability that B aborts, the rest of the signature queries should include either $ID_i$ or $w_k$.

To avoid aborting during the signature and hash query on $(ID_i, M_{j'}, w_k)$, it must be the case that $H_3\text{-coin}_{ij'k} = 0$. Thus, if $H_3\text{-coin}_{ij'k} = 0$ for any other tuple on which A makes a query, B aborts. Overall, the probability that B does not abort during these queries is $\delta_3 (1-\delta_3)^{q_{H3}-q_S}$.

The probability of abortion during the other queries depends on whether the signature queries include $ID_i$ or $w_k$. For any further hash and signature queries on $ID_i$, B aborts if $H_2\text{-coin}_k = 1$; so, the probability it does not abort during one such query is $\delta_2$. For hash and signature query pairs that include $w_k$ but not $ID_i$, B aborts only if $H_1\text{-coin}_i = H_3\text{-coin}_{i'j'k} = 1$; so, it does not abort with probability $1-(1-\delta_1)(1-\delta_3)$. Let $\delta_4 = \min\{\delta_2, 1-(1-\delta_1)(1-\delta_3)\}$. The overall probability that B does not abort is at least $\delta^{q_S}_4 \delta_3 (1-\delta_3)^{q_{h3}-q_S}$. Thus, $\Pr[E_{1,1,1}|S, H_3] \geq \Pr[E_{1,1,1}] \cdot \delta^{q_S}_4 \delta_3 (1-\delta_3)^{q_{h3}-q_S}$.

Bottom Line: Overall, B's probability of success is at least the product of $\epsilon$, the lower bound on the probability that it does not abort:

$\delta^{q_E}_1 \cdot (1-\delta_3)^{q_{h3}-q_S} \cdot (\delta_2)^{q_S},$ and the lower bound on the probability that B succeeds if A produces a forgery:

$(1-1/q)(1-\delta_1)(1-\delta_2)(1-\delta_3)\delta^{q_S}_4 \delta_3 (1-\delta_3)^{q_{H3}-q_S},$ We choose values of $(\delta_1, \delta_2, \delta_3)$ to lower bound this probability of success. Specifically, for $\delta_1 = 1-1/q_E$, $\delta_2 = 1-1/q_S$ and $\delta_3 = 1/(q_{H3}-q_S)$, we get that this product is at least:

$\epsilon(1-1/q)(1-\delta_1)\delta^{q_E}_1(1-\delta_2)\delta^{q_S}_2\delta^{q_S}_4\delta_3(1-\delta_3)^{2q_{h3}-2q_S+1} \geq \epsilon(1-1/q)(1/q_E q_S(q_{H3}-q_S))(1/2)^9 \geq \epsilon/(1024 q_E q_S(q_{H3}-q_S))$ assuming $q$, $q_E$, $q_S$ and $q_{H3}-q_S$ are each at least 2.

6. Multisignature Scheme

As mentioned above, an identity-based multisignature scheme is essentially a (degenerate) identity-based aggregate signature scheme in which different signers sign the same message. Since an identity-based multisignature scheme thus requires less flexibility than an identity-based aggregate signature scheme, we can achieve an identity-based multisignature scheme with better performance characteristics and better security characteristics than the preferred embodiment of the identity-based aggregate signature scheme. Here, we describe the preferred embodiment of an identity-based multisignature scheme.

Setup: The Private Key Generator (PKG) generates parameters and keys essentially as it does in previous pairing-based schemes. Specifically, it:

1. generates groups $G_1$ and $G_2$ of some prime order q and bilinear non-degenerate pairing $\hat{e}: G_1 \times G_1 \rightarrow G_2$ (this may be an admissible pairing; in some embodiments, q>3; in some embodiments, $G_1$ is an elliptic curve group or some other type of group, and $q > 2^{160}$);
2. chooses an arbitrary generator $P \in G_1$;
3. picks a random $s \in Z/qZ$ and sets $Q=sP$;
4. chooses cryptographic hash functions $H_1, H_2: \{0, 1\}^* \rightarrow G_1$.

The PKG's public key is $PK_{PKG}=(G_1, G_2, \hat{e}, P, Q, H_1, H_2)$. The root PKG's secret is $s \in Z/qZ$.

Private key generation: The client with identity $ID_i$ receives from the PKG the values of $sP_i$, where $P_i=H_1(ID_i) \in G_1$.

Individual Signing: To sign D, the signer with identity $ID_i$:
1. computes $P_D=H_2(D) \in G_1$;
2. generates random $r_i \in Z/qZ$;
3. computes its signature $(S'_i, T'_i)$, where $S'_i=r_iP_D+sP_i$ and $T'_i=r_iP$.

Aggregation: Anyone can aggregate a collection of individual signatures that sign the same document D. For example, individual signatures $(S'_i, T'_i)$ for $1 \leq i \leq n$ can be aggregated into $(S_n, T_n)$, where $$S_n = \sum_{i=1}^{n} S'_i \text{ and } T_n = \sum_{i=1}^{n} T'_i.$$

As with the identity-based aggregate signature scheme, signatures using the same document D can be aggregated even if the signers have different PKGs with different secret keys as long as the PKGs use the same parameters $(G_1, G_2, \hat{e}, P, H_2)$. See section 7 below.

Verification: Let $(S_n, T_n)$ be the identity-based aggregate signature (where n is the number of signers). The verifier checks that:

$$\hat{e}(S_n, P) = \hat{e}(T_n, P_D)\hat{e}\left(Q, \sum_{i=1}^{n} P_i\right),$$

where $P_i=H_1(ID_i)$, $P_D=H_2(D)$, as above.

7. Multiple-PKG Extensions

7.1 Aggregate Signatures

The identity-based aggregate signature scheme described above in section 3 can be extended to allow the signers to get their private keys from more than one PKG. Below, we describe an identity-based aggregate signature scheme with two PKGs, from which the extension to more PKGs should be obvious.

Setup: Both PKG1 and PKG2 use some of the same parameters as follows:
1. groups $G_1$ and $G_2$ of some prime order q and an admissible pairing $\hat{e}: G_1 \times G_1 \rightarrow G_2$;
2. an arbitrary generator $P \in G_1$;
3. a cryptographic hash function $H_2: \{0, 1\}^* \rightarrow G_1$.

PKG1 picks a random $s_1 \in Z/qZ$ and sets $Q_1=s_1P$; similarly, PKG2 generates $s_2$ and $Q_2$. The hash functions that the two PKGs use in the place of $H_1$ may be the same or may be different. In the preferred embodiment below, we will assume that they are the same, but we will ensure (with high probability) that their outputs are different by including the value of $Q_1$ as input to $H_1$ when PKG1 uses this function, while including the value of $Q_2$ as input to $H_1$ when PKG2 uses this function, as made clear below. One skilled in the art will readily identify different approaches that have a similar effect. The PKG1's public key is $PK_{PKG}=(G_1, G_2, \hat{e}, P, Q_1, H_1, H_2, H_3)$, while PKG2's public key uses $Q_2$ instead of $Q_1$. Their respective secrets are $s_1$ and $s_2$.

Private key generation: If the signer with identity $ID_i$ is a client of PKG1, it receives from PKG1 the values of $s_1P_{1,i,j}$ for $j \in \{0, 1\}$, where $P_{1,i,j}=H_1(Q_1, ID_i, j) \in G_1$. If it is a client of PKG2, it receives $s_2P_{2,i,j}$ for $j \in \{0, 1\}$ where $P_{2,i,j}=H_1(Q_2, ID_i, j) \in G_1$.

This scheme can be extended to the case of Remark 3B above (k uses of w). Each private key can be generated as above but contain k+1 points, $j \in \{0, k\}$.

Individual Signing: The first signer chooses a string w that it has never used before. Each subsequent signer checks that it has not used the string w chosen by the first signer. (Alternatively, different signers may arrive at the same w independently—e.g., if they issue signatures according to a pre-established schedule.) To sign $D_i$, the signer with identity $ID_i$ that is a client of PKGa (for $a \in \{1, 2\}$):
1. computes $P_w=H_2(w) \in G_1$;
2. computes $c_i=H_3(Q_a, D_i, ID_i, w) \in Z/qZ$;
3. generates random $r_i \in Z/qZ$;
4. computes its signature $(w, S'_i, T'_i)$, where $S'_i=r_iP_w+s_aP_{a,i,0}+c_is_aP_{a,i,1}$ and $T'_i=r_iP$.

Aggregation: Anyone can aggregate a collection of individual signatures that use the same string w. For example, individual signatures $(w, S'_i, T'_i)$ for $1 \leq i \leq n$ can be aggregated into $(w, S_n, T_n)$, where $$S_n = \sum_{i=1}^{n} S'_i \text{ and } T_n = \sum_{i=1}^{n} T'_i.$$

Verification: Let $(w, S_n, T_n)$ be the identity-based aggregate signature (where n is the number of signers). Let $I_1$ be the set of indices i in [1, n] for which the i-th signer is a client of PKG1. Let $I_2$ be the corresponding (and complementary) set of indices for PKG2. The verifier checks that:

$$\hat{e}(S_n, P) = \qquad (4)$$
$$\hat{e}(T_n, P_w)\hat{e}\left(Q_1, \sum_{i \in I1}(P_{1,i,0}+c_iP_{1,i,1})\right)\hat{e}\left(Q_2, \sum_{i \in I1}(P_{2,i,0}+c_iP_{2,i,1})\right).$$

Notice that the verifier now needs to know the public keys of two PKGs, rather than just one. One skilled in the art will recognize that the PKGs in this multiple-PKG identity-based aggregate signature scheme can be lower-level PKGs in a hierarchical identity-based cryptosystem, not just independent PKGs supervising private key generation for non-hierarchical client structures, as above. Also, the multiple-PKG scheme can be extended to the case described in Section 3, Remark 3B above (multiple uses of w).

Remark 7.1A: In some single-PKG and multiple-PKG embodiments, $G_2$ and ê are used only for verification (see equations (2), (4) above), and need not be generated by the PKGs. They can be generated by the verifier. In the multiple-PKG case, if the groups $G_2$ and the pairings ê are generated by the PKGs, then different PKGs can generate different $(G_2, ê)$ pairs. The verifier can select any of the $(G_2, ê)$ pairs for the signature verification (4), or can verify the signature by verifying that the equation (4) holds for different (possibly all) pairs $(G_2, ê)$.

7.2 Multisignatures

The multisignature scheme described above in section 6 can be extended to allow the signers to get their private keys from more than one PKG. Below, we describe a multisignature scheme with two PKGs, from which the extension to more PKGs should be obvious.

Setup: Both PKG1 and PKG2 use many of the same parameters, such as:

1. groups $G_1$ and $G_2$ of some prime order q and an admissible pairing ê: $G_1 \times G_1 \to G_2$;

2. an arbitrary generator $P \in G_1$;

3. a cryptographic hash function $H_2: \{0, 1\} \to G_1$.

PKG1 picks a random $s_1 \in Z/qZ$ and sets $Q_1 = s_1 P$; similarly, PKG2 generates $s_2$ and $Q_2$. The hash functions that the two PKGs use in the place of $H_1$ may be the same or may be different. In the preferred embodiment below, we will assume that they are the same, but we will ensure (with high probability) that their outputs are different by including the value of $Q_2$ as input to $H_1$ when PKG1 uses these functions, while including the value of $Q_1$ as input to $H_1$ when PKG2 uses them, as made clear below. The PKG1's public key is $PK_{PKG} = (G_1, G_2, ê, P, Q_1, H_1, H_2)$, while PKG2's public key uses $Q_2$ instead of $Q_1$. Their respective secrets are $s_1$ and $s_2$.

Private key generation: If the signer with identity $ID_i$ is a client of PKG1, it receives from PKG1 the value of $s_1 P_{1,i}$ where $P_{1,i} = H_1(Q_1, ID_i) \in G_1$. If it is a client of PKG2, it receives $s_2 P_{2,i}$ where $P_{2,i} = H_1(Q_2, ID_i) \in G_1$.

Individual Signing: To sign D, the signer with identity $ID_i$ that is a client of PKGa (for $a \in \{1, 2\}$):

1. computes $P_D = H_2(D)$;

2. generates random $r_i \in Z/qZ$;

3. computes its signature $(S'_i, T'_i)$, where $S'_i = r_i P_D + s_a P_{a,i}$ and $T'_i = r_i P$.

Aggregation: Anyone can aggregate a collection of individual signatures that use the same document D. For example, individual signatures $(w, S'_i, T'_i)$ for $1 \leq i \leq n$ can be aggregated into $(S_n, T_n)$, where $$S_n = \sum_{i=1}^{n} S'_i \text{ and } T_n = \sum_{i=1}^{n} T'_i.$$

Verification: Let $(S_n, T_n)$ be the identity-based aggregate signature (where n is the number of signers). Let $I_1$ be the set of indices i in [1, n] for which the i-th signer is a client of PKG1. Let $I_2$ be the corresponding (and complementary) set of indices for PKG2. The verifier checks that:

$$ê(S_n, P) = ê(T_n, P_D)ê\left(Q_1, \sum_{i \in I_1} P_{1,i}\right)ê\left(Q_2, \sum_{i \in I_1} P_{2,i}\right).$$

The PKGs in this multiple-PKG multisignature scheme can be lower-level PKGs in a hierarchical identity-based cryptosystem, not just independent PKGs supervising private key generation for non-hierarchical client structures, as above. Note that Remark 7.1A is applicable to the multisignatures.

8. Deterministic Identity-Based Aggregate Signature Scheme with No Security Proof Here, we describe an alternative embodiment of an identity-based aggregate signature scheme, in which the aggregate signature is deterministic (i.e., unique for a given PKG, set of identities, and set of documents). A drawback of this embodiment, in comparison to the one above, is that we have not been able to find a rigorous security proof for this scheme.

Setup: The Private Key Generator (PKG) generates a suitable RSA-type modulus n, e.g. where n is the product of two randomly chosen suitably large prime numbers $q_0, q_1$; each of $q_0$ and $q_1$ is at least 512-bit long in some embodiments. PKG also generates hash functions $H_1: \{0, 1\}^* \to Z/nZ$ and $H_2: \{0, 1\}^* \to \{0, 1\}^k$, where k is suitably large, e.g. 128. In addition, PKG generates groups $G_1$ and $G_2$ of order n with an admissible pairing ê: $G_1 \times G_1 \to G_2$. It chooses a generator $P \in G_1$. For example, it is simple to obtain a supersingular elliptic curve over the field $F_p$ of the integers modulo a prime number p, such that the elliptic curve group order is $p^L + 1$ for some L. If $n|(p^L+1)$ (i.e. n divides $p^L+1$), there will be a subgroup of order n. The PKG's secret is $q_0, q_1$. The PKG's public key is $(n, H_1, H_2)$.

Private key generation: The client with identity $ID_i$ receives from the PKG the private key values $a_{i,j} = H_1(ID_i, j)^{1/2} \pmod{n}$ for $1 \leq j \leq k$. Obviously, not every number in Z/nZ is a quadratic residue. However, there are standard techniques for dealing with this, which are well-known in the art. For example, let $b_{i,j} = H_1(ID_i, j) \pmod{n}$. Then one of $b_{i,j}, 2b_{i,j}, -b_{i,j}, -2b_{i,j}$ is a quadratic residue mod n. Let $c_{i,j}$ be the first in the list of numbers 1, −1, 2, or −2 such that $c_{i,j} b_{i,j}$ is a quadratic residue. Then the PKG sets $a_{i,j} = [c_{i,j} H_1(ID_i, j)]^{1/2} \pmod{n}$ for $1 \leq j \leq k$. Notice that anyone can compute the "public keys" $b_{i,j} = H_1(ID_i, j) \pmod{n}$ for $1 \leq j \leq k$.

Signing: Let $S_{i-1} \in G_1$ be the identity-based aggregate signature produced by the first i−1 signers on documents $(D_1, \ldots, D_{i-1})$. (Set $S_0 = P$.) To include its signature on $D_i$, the ith signer computes $e_i = H_2(D_i)$. Let $e_{i,j} = e(i, j)$ be the jth bit of $e_i$. The signer computes:

$$S_i = \prod_{j=1}^{k} (a_{i,j})^{e(i,j)} S_{i-1}$$

Verification: If m is the number of signers, check that $ê(S_m, S_m) = ê(P, P)^b$, where $$b = \prod_{i=1}^{m} \prod_{j=1}^{k} (c_{i,j} b_{i,j})^{e(i,j)},$$

where the $e_{i,j}$'s are computed as above.

The verifier needs $c_{i,j}$'s to perform this verification. Each $c_{i,j}$ is a two bit number. In some embodiments, signer 1 (the first signer) provides its coefficients $c_{1,j}$ ($1 \leq j \leq k$) to the next signer 2, signer 2 provides the coefficients $c_{1,j}$ and $c_{2,j}$ ($1 \leq j \leq k$) to signer 3, and so forth. The last signer provides all of the $c_{i,j}$ coefficients to the verifier. These coefficients are at most 2 mk bits total in length (mk coefficients of two bits each).

Another embodiment is based on the observation that the verifier needs only the product $$C = \prod_{i=1}^{m} \prod_{j=1}^{k} c_{i,j}^{e(i,j)}.$$

In this embodiment, signer 1 provides to signer 2 the product $$C_1 = \prod_{j=1}^{k} c_{1,j}^{e(1,j)}.$$

Signer 2 provides to the next signer the product $$C_2 = C_1 \prod_{j=1}^{k} c_{2,j}^{e(2,j)},$$

and so on. The last signer computes the product $$C = c_{m-1} \prod_{j=1}^{k} c_{m,j}^{e(m,j)}$$

and provides this product to the verifier. The magnitude of C is at most $2^{mk}$ (since each $|c_{i,j}| \leq 2$), and is a power of 2. Hence only the sign of C and the value $\log_2 |C|$ need to be provided to the verifier. The size of this information is at most $2 + \log_2 mk$ bits because $\log_2 |C| \leq mk$.

The invention is not limited to the embodiments described above. In particular, the invention is not limited to any particular groups G1 or G2. In some embodiments, G1 and or G2 can be $F_p^*$ (the unit group of the Galois field $F_p$ of integers modulo a prime number p), or $F_{p^m}^*$ (the unit group of the Galois field $F_{p^m}$ of polynomials modulo an irreducible polynomial of a prime power p). In some embodiments, p=2. In some embodiments, the group G1 is an elliptic curve over $F_p^m$ (e.g. $F_2^m$) or $F_p$ or some other field, or an Abelian variety over any one of the fields described above. As is well known, an elliptic curve over a field F is a group consisting of:

(1) the set of pairs (x, y) where x and y are in F and:
   $f(x, y) = y^2 - x^3 - ax - b = 0$ for predefined integers a and b; and
(2) a point O "at infinity", with a group operation defined as follows:
   1. O+O=O
   2. (x, y)+O=(x, y)
   3. (x, y)+(x, -y)=O
   4. For any two distinct points $(x_1, y_1)$, $(x_2, y_2)$, such that $x_1 \neq x_2$, their sum $(x_3, y_3)$ is defined as follows:

$L = (y_2 - y_1)/(x_2 - x_1)$ $x_3 = L^2 - x_1 - x_2$, $y_3 = L(x_1 - x_3) - y_1$

5. For any point $(x_1, y_1)$, its doubling $(x_1, y_1) + (x_1, y_1) = (x_2, y_2)$ is defined as follows:

$L = (3x_1^2 + a)/(2y_1)$ $x_3 = L^2 - 2x_1$, $y_3 = L(x_1 - x_3) - y_1$

See for example PCT application WO 99/30458 published 17 Jun. 1999 and U.S. Pat. No. 6,778,666 B1 issued Aug. 17, 2004, both incorporated herein by reference.

The elliptic curve is called supersingular if the derivatives of f(x,y) simultaneously vanish at some point on the curve. This condition is equivalent to $4a^3 + 27b^2 = 0$. Either supersingular and non-supersingular elliptic curves can be used for the groups G1 and G2 in some embodiments. Also, Abelian varieties can be used, which are multidimensional generalizations of the elliptic curves.

In some embodiments, the bilinear pairings ê are Weil or Tate pairings. These pairings are defined in Dan Boneh and Matthew Franklin, Identity-*Based Encryption from the Weil Pairing*, SIAM J. of Computing, Vol. 32, No. 3, pp. 586-615, 2003, incorporated herein by reference.

The invention is not limited to any particular hash functions. It is desirable, but not necessary, for the hash functions to be infeasible to invert and collision resistant. Suitable non-limiting examples include SHA-1, SHA-256, SHA-384, and SHA-512 specified in SECURE HASH SIGNATURE STANDARD, Federal Information Processing Standard Publication 180-2 (FIPS PUB 180-2), 1 Aug. 2002, National Institute of Standards and Technology (NIST), United States of America, incorporated herein by reference. The invention is not limited to signature schemes with a low Kolmogorov complexity, or to identity based signature schemes. In identity-based schemes, the signer identity can be that of a human being, a corporation or some other company, or some other entity. The identity can include all or part of a human's or company's name, street or email address, telephone number, web page address, or other information that can be ascertained by the verifier without being provided by the signer. In the algorithms described above, the elements of residue classes such as Z/qZ (for example, the PKG secret key s) can be represented simply as integers. They can be any integers, e.g. in the interval [1, q−1] or [2, q−1], or [−(q−1)/2, (q−1)/2]. Also, the invention is not limited to the groups G1, G2 being finite groups. Other embodiments and variations are within the scope of the invention, as defined by the appended claims.

REFERENCES (ALL OF WHICH ARE INCORPORATED HEREIN BY REFERENCE)

[1] P. S. L. M. Barreto, H. Y. Kim, B. Lynn, and M. Scott. Efficient Algorithms for Pairing-Based Cryptosystems. In *Proc. of Crypto* 2002, LNCS 2442, pages 354-368. Springer-Verlag, 2002.

[2] D. Boneh and M. Franklin. Identity-Based Encryption from the Weil Pairing. *SIAM J. Computing*, 32(3): 586-615, 2003. Extended abstract in *Proc. of Crypto* 2001.

[3] D. Boneh, C. Gentry, B. Lynn, and H. Shacham. Aggregate and Verifiably Encrypted Signatures from Bilinear Maps. In *Proc. of Eurocrypt* 2003, LNCS 2656, pages 416-432. Springer-Verlag, 2003.

[4] D. Boneh, B. Lynn, and H. Shacham. Short Signatures from the Weil Pairing. In *Proc. of Asiacrypt* 2001, LNCS 2248, pages 514-532. Springer-Verlag, 2001.

[5] A. Lysyanskaya, S. Micali, L. Reyzin, and H. Shacham. Sequential Aggregate Signatures from Trapdoor Permutations. In *Proc. of Eurocrypt* 2004, LNCS 3027, pages 74-90. Springer-Verlag, 2004.

[6] S. Micali, K. Ohta, and L. Reyzin. Accountable Subgroup Multisignatures (extended abstract). In *Proc of CCS 2001*, pages 245-54. ACM Press, 2001.

[7] A. Shamir, Identity-Based Cryptosystems and Signature Schemes. In *Proc. of Crypto* 1984, LNCS 196, pages 47-53. Springer-Verlag, 1985.

The invention claimed is:

1. A system-implemented method of generating a first digital signature on a document D, the system comprising circuitry, the method comprising generating, by the circuitry, a signal representing a sum S1 of a plurality of terms of a predefined cyclic group G1, said terms comprising k terms:

$$C1*(s*P1), C2*(s*P2), \ldots Ck*(s*Pk),$$

wherein:
k and s are predefined integers independent of the document D, and k>1;
C1, ... Ck are integers, wherein at least two of C1, ... Ck are different from each other, wherein at least one of C1, ... Ck depends on the document D;
P1, ... Pk are k different elements of the group G1 which are independent of the document D;
"*" denotes multiplication by an integer of an element of the group G1.

2. The method of claim 1 wherein G1 is finite group of a prime order greater than 3, and each of s, C1, ... , Ck is less than the order of G1.

3. The method of claim 1 wherein the elements P1, ... , Pk are functions of a signer's identity.

4. A computer readable manufacture comprising one or more computer instructions configured for causing a computer system to perform the method of claim 3.

5. A computer system configured for implementing the method of claim 3.

6. A manufacture comprising a computer readable medium comprising one or more computer instructions configured for causing a computer system to perform the method of claim 3.

7. The method of claim 1 further comprising generating a random integer r and determining a term r*Pw where Pw is an element of the group G1, wherein said terms for the sum S1 also include the term r*Pw.

8. The method of claim 1 wherein the first digital signature comprises a set of one or more components including a first component representing the sum S1;
wherein the method further comprises aggregating, by the circuitry, the first digital signature with one or more second digital signatures to obtain a first aggregate digital signature, each second digital signature being an individual digital signature or an aggregate digital signature which comprises an aggregate of individual digital signatures, each second digital signature comprising a set of one or more components including a first component which is an element of the group G1, wherein the aggregating operation to obtain the first aggregate digital signature comprises adding the first component of the first digital signature to the one or more first components of the one or more second digital signatures.

9. The method of claim 8 wherein each individual digital signature is generated by an instance of said operation of generating a signal representing a sum S1, each instance being performed with the same group G1 and the same integer k as for the first digital signature, but with the same or different parameters s, P1, ... Pk, D, C1, ... Ck.

10. The method of claim 9 wherein the terms of each sum S1 of the first digital signature and of each individual digital signature includes a term r*Pw wherein Pw is an element of the group G1 and r is an integer, wherein Pw is the same for the first digital signature and each individual digital signature, wherein r is or is not the same for the first digital signature and each individual digital signature;
wherein the first aggregate digital signature is generated repeatedly more than k times, and the term Pw remains unchanged at most k times.

11. The method of claim 10 wherein the term Pw is generated as a hash function from an input string of binary digits.

12. A computer readable manufacture comprising one or more computer instructions configured for causing a computer system to perform the method of claim 10.

13. A computer system configured for implementing the method of claim 1.

14. A manufacture comprising a computer readable medium comprising one or more computer instructions configured for causing a computer system to perform the method of claim 1.

15. A system-implemented method of generating a first aggregate digital signature, the system comprising circuitry, the first aggregate digital signature comprising an aggregate of a plurality of individual digital signatures $IS\_1, \ldots IS\_n$, where n is an integer greater than 1, each individual digital signature $IS\_i$ (i=1, ... , n) being a signature on a corresponding document $D\_i$, each signatures $IS\_i$ comprising a first component $S\_i$ representing a sum of a plurality of terms of a predefined cyclic group G1, said terms comprising k terms:

$$C1\_i*(s\_i*P1\_i), \quad C2\_i*(s\_i*P2\_i), \quad \ldots \quad Ck\_i*(s\_i*Pk\_i),$$

wherein:
k and $s\_i$ are predefined integers independent of the document $D\_i$, and k>1;
$C1\_i, \ldots Ck\_i$ are integers, wherein at least two of $C1\_i, \ldots Ck\_i$ are different from each other, wherein at least one of $C1\_i, \ldots Ck\_i$ depends on the document $D\_i$;
$P1\_i, \ldots Pk\_i$ are k different elements of the group G1 which are independent of the document $D\_i$;
"*" denotes multiplication by an integer of an element of the group G1;
wherein the first aggregate digital signature comprises a first component representing a sum S of the sums $S\_i$;
wherein the method comprises:
receiving, by the circuitry, terms of the sum S, each term of the sum S representing one of the sums $S\_i$ or a sum of a plurality of the sums $S\_i$; and
adding, by the circuitry, the terms of the sum S.

16. The method of claim 15 wherein for each signature $IS\_i$, the corresponding elements $P1\_i, \ldots Pk\_i$ are functions of an identity of a signer associated with the signature $IS\_i$.

17. The method of claim 15 wherein each signature $IS\_i$ further comprises a second component $T\_i=r\_i*P$ where $r\_i$ is an integer and P is a predefined element of the group G1, P being independent of i, the first aggregate signature further comprises a second component T representing the sum of the components $T\_i$, and the method further comprises:
receiving, by the circuitry, terms of the component T, each term of the component T representing one of the components $T\_i$ or a sum of a plurality of the components $T\_i$; and
adding, by the circuitry, the terms of the component T.

18. A computer readable manufacture comprising one or more computer instructions configured for causing a computer system to perform the method of claim 17.

19. A computer system configured for implementing the method of claim 15.

20. A manufacture comprising a computer readable medium comprising one or more computer instructions configured for causing a computer system to perform the method of claim 15.

21. A system-implemented method of verifying a digital signature DS1 to determine whether or not the digital signature DS1 is constructed according to the method of claim 3, the system comprising circuitry, wherein the digital signature DS1 comprises a first component COMP1 corresponding to the sum S1;

the method comprising verifying, by the circuitry, an equality $$bp1(COMP1, P)=f1 \& bp1(Q, \Sigma CP);$$

wherein:
bp1 is a non-degenerate bilinear pairing from G1×G1 into a group G2;
f1 is an element of the group G2;
"&" is a group operation of the group G2;
P is an element of the group G1;
Q=s*P; and
ΣCP=C1*P1+C2*P2+ . . . +Ck*Pk.

22. The method of claim 21 wherein G1 and G2 are finite cyclic groups having the same, prime order greater than 3, and P is a generator of the group G1.

23. The method of claim 22 further comprising determining the elements P1, . . . , Pk from a signer's identity.

24. A computer readable manufacture comprising one or more computer instructions configured for causing a computer system to perform the method of claim 23.

25. A computer system configured for implementing the method of claim 21.

26. A manufacture comprising a computer readable medium comprising one or more computer instructions configured for causing a computer system to perform the method of claim 21.

27. A system-implemented method of verifying a first aggregate digital signature to determine if the first aggregate digital signature comprises an aggregate of individual digital signatures IS_1, . . . , IS_n where n is an integer greater than 1, each individual digital signature IS_i (i=1, . . . , n) being a signature on a corresponding document D_i, wherein each individual digital signature IS_i comprises a set of one or more components including a first component which is a sum S1_i of a plurality of terms of a predefined cyclic group G1, said terms comprising k terms:

$$C1\_i*(s*P1\_i), \quad C2\_i*(s*P2\_i), \quad . \quad . \quad . \\ Ck\_i*(s*Pk\_i),$$

wherein k is a predefined integer greater than 1, wherein k is independent of the documents D_1, . . . D_n, and k is the same for all of the individual digital signatures IS_i;
wherein, for each individual digital signature IS_i:
(i) s is a predefined integer independent of the documents D_1, . . . D_n;
(ii) C1_i, . . . Ck_i are non-negative integers, wherein at least two of C1_i, . . . Ck_i are different from each other, wherein at least one of C1_i, . . . Ck_i depends on the corresponding document D_i;
(iii) P1_i, . . . Pk_i are k different elements of the group G1 which are independent of the documents D_1, . . . D_n;
"*" denotes multiplication by an integer of an element of the group G1;
wherein the aggregate of the individual digital signatures comprises a component ΣS1 which is the sum of the sums S1_i, and the first aggregate digital signature comprises a corresponding component Sn;

wherein the system comprises circuitry;
the method comprising verifying, by the circuitry, an equality $$bp1(Sn, P)=f1\&\pi$$

wherein:
bp1 is a non-degenerate bilinear pairing from G1×G1 into a group G2;
P is a generator of the group G1;
f1 is an element of the group G2;
"&" is a group operation of the group G2; and
one of the following conditions (A) and (B) holds true:
(A) the s parameter has the same value for all the individual digital signatures, and $$\pi=bp1(Q, \Sigma P);$$

wherein:
Q=s*P; and
ΣP is the sum of the terms $$C1\_i*P1\_i, C2*P2\_i, \ldots Ck\_i*Pk\_i$$

taken over all i from 1 to n; or
(B) the s parameter ranges over L different values s_1, . . . s_L, where L>1, and each value s=s_j (j=1, . . . L) corresponds to one or more of the individual digital signatures IS_i; and $$\pi=BP1(Q\_1, \Sigma P\_1)\& \ldots \& BP1(Q\_L, \Sigma P\_L)$$

wherein, for each j=1, . . . L:
Q_j=s_j*P; and
ΣP_j is the sum of the terms $$C1\_i*P1\_i, C2\_i*P2\_i, \ldots Ck\_i*Pk\_i$$

taken over all i such that the individual digital signature IS_i corresponds to the value s_j.

28. The method of claim 27 wherein G1 and G2 are finite cyclic groups having the same, prime order greater than 3;
for each individual signature IS_i, each of s, C1_i, . . . , Ck_i is less than the order of G1.

29. The method of claim 27 further comprising determining, for each signature IS_i, the elements P1, . . . Pk from an identity of a signer associated with the signature IS_i.

30. A computer readable manufacture comprising one or more computer instructions configured for causing a computer system to perform the method of claim 29.

31. A computer system configured for implementing the method of claim 27.

32. A manufacture comprising a computer readable medium comprising one or more computer instructions configured for causing a computer system to perform the method of claim 27.

33. A method of generating a private key, the method comprising:
(1) receiving, by circuitry, an entity's identity ID1;
(2) generating by the circuitry, from said identity ID1, k elements P1, . . . Pk of a predefined cyclic group G1, wherein k>1 and:

$$P1=s*H1(ID1, par\_1), \ldots Pk=s*H1(ID1, par\_k)$$

wherein H1 is a predefined function with an image in the group G1;
wherein par_1, . . . par_k are predefined different parameters;
s is an integer; and
"*" denotes multiplication by an integer of an element of the group G1.

34. The method of claim 33 wherein the method is performed repeatedly in response to different entities' identities, with the same group G1 and the same parameter s and the same function H1.

35. A computer readable manufacture comprising one or more computer instructions configured for causing a computer system to perform the method of claim 34.

36. The method of claim 33 wherein G1 is has a prime order greater than 3, and s is less than the order of G1.

37. A computer system configured for implementing the method of claim 33.

38. A manufacture comprising a computer readable medium comprising one or more computer instructions configured for causing a computer system to perform the method of claim 33.

39. A system-implemented method of generating a first aggregate digital signature on a document D, the system comprising circuitry, the first aggregate digital signature comprising an aggregate of a plurality of individual digital signatures $IS\_1, \ldots IS\_n$, where n is an integer greater than 1, each individual digital signature $IS\_i (i=1, \ldots, n)$ comprising a first component representing a sum $S\_i$ of a plurality of terms of a predefined cyclic group G1, said terms comprising the terms:

$$r\_i * PD \text{ and } (s\_i * P\_i)$$

wherein:
r_i and s_i are integers independent of the document D;
PD and P_i are elements of the group G1, wherein PD depends on the document D and is the same for all the signatures IS_i, and P_i is independent of the document D;
"*" denotes multiplication by an integer of an element of the group G1;
wherein the first aggregate digital signature comprises a component representing a sum S of the sums S_i;
wherein the method comprises:
receiving, by the circuitry, terms of the sum S, each term of the sum S representing one of the sums S_i or a sum of a plurality of the sums S_i; and
adding, by the circuitry, the terms of the sum S.

40. The method of claim 39 wherein G1 is has a prime order greater than 3, and each of s_i and r_i is less than the order of G1.

41. A computer readable manufacture comprising one or more computer instructions configured for causing a computer system to perform the method of claim 40.

42. The method of claim 39 wherein for each signature IS_i, the element P_i is a function of an identity of a signer associated with the signature IS_i.

43. A computer system configured for implementing the method of claim 39.

44. A manufacture comprising a computer readable medium comprising one or more computer instructions configured for causing a computer system to perform the method of claim 39.

45. A system-implemented method of verifying a first aggregate digital signature to determine if the first aggregate digital signature comprises an aggregate of individual digital signatures $IS\_1, \ldots, IS\_n$ where n is an integer greater than 1, each individual digital signature $IS\_i (i=1, \ldots, n)$ being a signature on a document D which is the same document for all the signatures IS_i, wherein each individual digital signature IS_i comprises a set of one or more components including a first component which is a sum $S1\_i$ of a plurality of terms of a predefined cyclic group G1, said terms comprising k terms:

$$r\_i * PD \text{ and } (s * P\_i)$$

wherein:
r_i and s are integers independent of the document D;
PD and P_i are elements of the group G1, wherein PD depends on the document D and is the same for all the signatures IS_i, and P_i is independent of the document D;
"*" denotes multiplication by an integer of an element of the group G1;
wherein the first aggregate digital signature comprises a component Sn corresponding to a sum S of the sums S_i;
wherein the aggregate of the individual digital signatures comprises a component $\Sigma S1$ which is the sum of the sums $S1\_i$, and the first aggregate digital signature comprises a corresponding component Sn;
wherein the system comprises circuitry;
the method comprising verifying, by the circuitry, an equality $$bp1(Sn, P) = f1 \& \pi$$

wherein:
bp1 is a non-degenerate bilinear pairing from G1×G1 into a group G2;
P is a generator of the group G1;
f1 is an element of the group G2;
"&" is a group operation of the group G2; and
one of the following conditions (A) and (B) holds true:
(A) the s parameter has the same value for all the individual digital signatures IS_i, and $$\pi = bp1(Q, \Sigma P);$$

wherein:
Q = s*P; and $$\Sigma P = \sum_{i=1}^{n} P\_i$$

or
(B) the s parameter ranges over L different values $s\_1, \ldots s\_L$, where L>1, and each value $s=s\_j$ ($i=1, \ldots L$) corresponds to one or more of the individual digital signatures IS_j; and $$\pi = bp1(Q\_1, \Sigma P\_1) \& \ldots \& bp1(Q\_L, \Sigma P\_L)$$

wherein, for each j=1, ... L:
Q_j = s_j*P; and
ΣP_j is the sum of the terms P_i taken over all the individual digital signatures corresponding to the value s_j.

46. The method of claim 45 wherein the condition (A) holds true.

47. A computer readable manufacture comprising one or more computer instructions configured for causing a computer system to perform the method of claim 46.

48. The method of claim 45 wherein G1 is has a prime order greater than 3, G2 is a cyclic group of the same order as G1, and each of the integers s and r_i is less than the order of G1.

49. The method of claim 45 wherein for each signature IS_i, the element P_i is a function of an identity of a signer associated with the signature IS_i.

50. A computer system configured for implementing the method of claim 49.

51. A computer system configured for implementing the method of claim 45.

52. A manufacture comprising a computer readable medium comprising one or more computer instructions configured for causing a computer system to perform the method of claim 45.

53. A system-implemented method of generating a first digital signature representing a signature of m signers, m being a positive integer, wherein each signer j (j=1, ..., m) is an entity associated with a key (a_j,1, ... a_j,k) where k is a positive integer and where a_j,1, ... a_j,k are integers, the system comprising circuitry, the method comprising:
- (1) generating, by the circuitry, k bits (e_1, ... e_k) which are functions of a document D_m associated with the signer m;
- (2) generating, by the circuitry, a term of a predefined cyclic group G1, said term being:

$$((a\_m,1)^{e-1} \otimes \ldots \otimes (a\_m,k)^{e-k}) * S\_PREV\_m$$

wherein:
$\otimes$ is a multiplication in the ring Z/nZ of integers modulo a predefined positive integer n;
S_PREV_m is an element of the group G1;
"*" denotes multiplication by an integer of an element of the group G1.

54. The method of claim 53 wherein m=1 and S_PREV_m is a generator of the group G1.

55. A manufacture comprising a computer readable medium comprising one or more computer instructions configured for causing a computer system to perform the method of claim 54.

56. The method of claim 53 wherein m>1 and S_PREV_m is obtained by performing, by the circuitry, the operations (1) and (2) for each of signers 1, ... m−1 and the respective documents D_1, ... D_(m−1).

57. A computer readable manufacture comprising one or more computer instructions configured for causing a computer system to perform the method of claim 56.

58. The method of claim 53 wherein G1 is finite of an order equal to said integer n.

59. The method of claim 53 wherein n is a product of two prime numbers each of which is greater than 1.

60. The method of claim 53 wherein each key (a_j,1, ... a_j,k) is a function of the signer j's identity.

61. A computer system configured for implementing the method of claim 53.

62. A manufacture comprising a computer readable medium comprising one or more computer instructions configured for causing a computer system to perform the method of claim 53.

63. A system-implemented method of generating a private key, the method comprising:
receiving, by the circuitry, an entity's identity ID1; and
generating by the circuitry, from the identity ID1, k integers a_1, ... a_k which represent residue classes modulo a predefined positive integer n, wherein:
k>1 is an integer;
a_j=(H1(ID1, par_j))$^{1/2}$(mod n), for j=1, ..., k
H1 is a predefined function with an image in Z/nZ;
par_1, ... par_k are predefined different parameters.

64. The method of claim 63 wherein:
H1(·)=f1*HF1(·), wherein
HF1(·) is a predefined function with an image in Z/nZ; and
f1 is 1, −1, 2, or −2 and such that f1*HF1(·) is a square in Z/nZ.

65. The method of claim 63 wherein n is a product of two prime numbers each of which is greater than 1.

66. A computer readable manufacture comprising one or more computer instructions configured for causing a computer system to perform the method of claim 65.

67. A computer system configured for implementing the method of claim 63.

68. A manufacture comprising a computer readable medium comprising one or more computer instructions configured for causing a computer system to perform the method of claim 63.

69. A system-implemented method of verifying a first aggregate digital signature Sn to determine if the first aggregate digital signature represents signatures of signature of m signers, m>1, on respective documents D_1, ... D_m, wherein each signer j (j=1, ..., m) is an entity associated with a key (b_j,1, ... b_j,k) where k, b_j,1, ... b_j,k are integers, wherein Sn is an element of a predefined cyclic group G1 having a generator P, the system comprising circuitry, the method comprising verifying, by the circuitry, an equality:

$$bp1(Sn, Sn)=bp1(P, P)^b$$

wherein:
bp1 is a bilinear mapping from G1×G1 into a cyclic group G2; and
b is the product, modulo a predefined modulus n, of all said integers b_j,i.

70. The method of claim 69 wherein each b_j,i is a square modulo n.

71. A computer readable manufacture comprising one or more computer instructions configured for causing a computer system to perform the method of claim 70.

72. The method of claim 69 wherein n is a product of two prime numbers each of which is greater than 1.

73. A computer readable manufacture comprising one or more computer instructions configured for causing a computer system to perform the method of claim 72.

74. The method of claim 69 wherein each key (b_j,1, ... b_j,k) is a function of the signer j's identity.

75. A computer system configured for implementing the method of claim 69.

76. A manufacture comprising a computer readable medium comprising one or more computer instructions configured for causing a computer system to perform the method of claim 69.

77. A system-implemented method of generating a private cryptographic key comprising a plurality of components, the system comprising circuitry, the method comprising:
- (1) receiving, by the circuitry, an entity's identity ID1;
- (2) generating, by the circuitry, at least two of said components from said identity ID1, wherein said at least two of the components are different from each other;

wherein said at least two of the components are elements P1, ... Pk of a predefined cyclic group G1 of an order greater than k, wherein k>1 and:

$$P1=s*H1(ID1, par\_1), \ldots Pk=s*H1(ID_1, par\_k)$$

wherein H1 is a predefined function with an image in the group G1;
wherein par_1, ... par_k are predefined different parameters;
s is an integer; and
"*" denotes multiplication by an integer of an element of the group G1.

78. The method of claim 77 wherein the method is performed repeatedly in response to different entities' identities, with the same group G1.

79. A computer readable manufacture comprising one or more computer instructions configured for causing a computer system to perform the method of claim 78.

80. The method of claim 77 wherein G1 has a prime order greater than 3, and s is less than the order of G1.

81. A computer system configured for implementing the method of claim 77.

82. A manufacture comprising a computer readable medium comprising one or more computer instructions configured for causing a computer system to perform the method of claim 77.

83. A computer readable manufacture comprising one or more computer instructions configured for causing a computer system to perform the method of claim 77.

84. A system-implemented method of generating a first digital signature on a document D, the system comprising circuitry, the method comprising:
wherein the operation (2) comprises generating, by the circuitry, a signal representing a sum S1 of a plurality of terms of the group G1, said terms comprising k terms:

$$C1*SK\_1, C2*SK\_2, \ldots Ck*SK\_k,$$

wherein:
SK_1, SK_2, ... SK_k are said components, and k is the number of said components;
C1, ... Ck are integers, wherein at least two of C1, ... Ck are different from each other, wherein at least one of C1, ... Ck depends on the document D;
"*" denotes multiplication by an integer of an element of the group G1.

85. The method of claim 84 wherein the order of G1 is a prime number.

86. A system-implemented method of verifying a digital signature DS1 to determine whether or not the digital signature DS1 is constructed according to the method of claim 84, the system comprising circuitry,
the method comprising verifying, by the circuitry, a relationship comprising at least two different functions of the signer's identity.

87. A computer system configured for implementing the method of claim 86.

88. A manufacture comprising a computer readable medium comprising one or more computer instructions configured for causing a computer system to perform the method of claim 86.

89. A computer system configured for implementing the method of claim 84.

90. A manufacture comprising a computer readable medium comprising one or more computer instructions configured for causing a computer system to perform the method of claim 84.

91. A computer readable manufacture comprising one or more computer instructions configured for causing a computer system to perform the method of claim 84.

* * * * *